United States Patent
Yamaoka

(10) Patent No.: US 10,742,430 B2
(45) Date of Patent: Aug. 11, 2020

(54) INFORMATION PROCESSING APPARATUS AND INFORMATION PROCESSING METHOD

(71) Applicant: FUJITSU LIMITED, Kawasaki-shi, Kanagawa (JP)

(72) Inventor: Hisatoshi Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 16/204,662

(22) Filed: Nov. 29, 2018

(65) Prior Publication Data
US 2019/0182058 A1 Jun. 13, 2019

(30) Foreign Application Priority Data
Dec. 13, 2017 (JP) .................. 2017-238489

(51) Int. Cl.
| | | |
|---|---|---|
| *H04L 12/14* | (2006.01) | |
| *H04L 12/24* | (2006.01) | |
| *H04L 12/927* | (2013.01) | |
| *H04L 29/08* | (2006.01) | |

(Continued)

(52) U.S. Cl.
CPC .......... *H04L 12/1442* (2013.01); *H04L 12/14* (2013.01); *H04L 12/1403* (2013.01); *H04L 41/069* (2013.01); *H04L 41/22* (2013.01); *H04L 41/5022* (2013.01); *H04L 47/805* (2013.01); *H04L 67/10* (2013.01); *H04L 67/16* (2013.01);

(Continued)

(58) Field of Classification Search
CPC . H04L 12/1442; H04L 12/14; H04L 12/1403; H04L 41/069; H04L 41/22; H04L 41/5022; H04L 47/805; H04L 67/10; H04M 15/00; H04W 4/24

See application file for complete search history.

(56) References Cited

U.S. PATENT DOCUMENTS

| | | | | | |
|---|---|---|---|---|---|
| 5,257,357 | A | * | 10/1993 | Yishay | ................. G06F 13/26 710/269 |
| 5,999,015 | A | * | 12/1999 | Cliff | ................. H03K 19/1774 326/39 |

(Continued)

FOREIGN PATENT DOCUMENTS

| | | |
|---|---|---|
| JP | 2009-536480 | 10/2009 |
| JP | 2012-074056 | 4/2012 |

*Primary Examiner* — Philip J Chea
*Assistant Examiner* — Robert B McAdams
(74) *Attorney, Agent, or Firm* — Fujitsu Patent Center

(57) ABSTRACT

An information processing apparatus includes a processor. The processor assigns priority levels to respective logics arranged in a chain graph. Each logic is activated by an input event to generate an output event. The processor allocates tokens to the logics based on the priority levels. The processor estimates, for each of the logics, a total number of generated output events to obtain an expected amount of tokens corresponding to the total number. The processor compares, for each of the logics, the expected amount of tokens to an amount of the allocated tokens to determine whether each of the logics has a surplus or a shortage in the allocated tokens. The processor adjusts a frequency of activating each of logics having the shortage. The processor calculates a total amount of the surplus. The processor reallocates the total amount of the surplus to the logics having the shortage.

8 Claims, 20 Drawing Sheets

(51) Int. Cl.
*H04M 15/00* (2006.01)
*H04W 4/24* (2018.01)

(52) U.S. Cl.
CPC .......... *H04M 15/00* (2013.01); *H04M 15/78* (2013.01); *H04W 4/24* (2013.01)

(56) References Cited

U.S. PATENT DOCUMENTS

| | | | | |
|---|---|---|---|---|
| 6,608,638 | B1* | 8/2003 | Kodosky | G06F 30/34 |
| | | | | 715/771 |
| 7,143,216 | B1* | 11/2006 | Milligan | G06F 13/409 |
| | | | | 710/104 |
| 9,864,636 | B1* | 1/2018 | Patel | G06F 9/5061 |
| 2003/0222912 | A1* | 12/2003 | Fairweather | G06F 9/4494 |
| | | | | 715/763 |
| 2007/0258433 | A1 | 11/2007 | Speight | |

* cited by examiner

FIG. 9

Table 51:

| LOGIC ID | PRIORITY LEVEL |
|---|---|
| 001 | 5 |
| 002 | 5 |
| 003 | 3 |
| 004 | 5 |
| 005 | 5 |

Table 53:

| LOGIC ID | INPUT LOGIC ID | OUTPUT LOGIC ID LIST |
|---|---|---|
| 001 | – | 004, 005 |
| 002 | 001 | 003, 004 |
| 003 | 002 | – |
| 004 | 001, 002 | 005 |
| 005 | 001, 004 | – |

Table 55:

| LOGIC ID | ARRIVAL COUNT (TIMES) |
|---|---|
| 001 | 1922 |
| 002 | 342 |

Table 57:

| LOGIC ID | ESTIMATION ARRIVAL COUNT (PER MINUTE) |
|---|---|
| 001 | 300 |
| 002 | 15 |

Table 59:

| LOGIC ID | ALLOCATION RATIO |
|---|---|
| 001 | 0.22 |
| 002 | 0.22 |
| 003 | 0.12 |
| 004 | 0.22 |
| 005 | 0.22 |

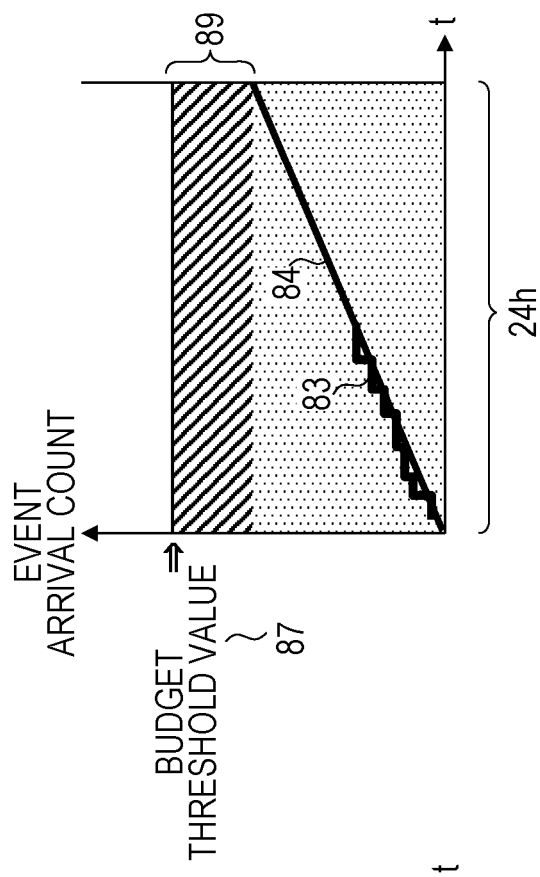
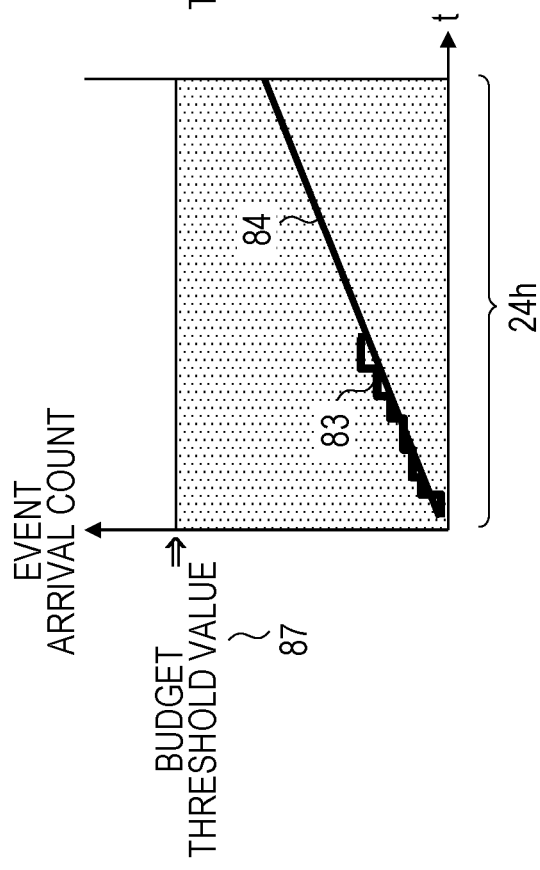

FIG. 19

| SLA ITEM / CATEGORY | FIELD MONITORING/ VISUALIZATION APPLICATION | ERROR NOTIFICATION APPLICATION | CHARGE (YEN/MONTH) |
|---|---|---|---|
| COURSE X | SCREEN UPDATE EVERY SEVERAL MINUTES | ARRIVAL OF NOTIFICATION AFTER SEVERAL MINUTES | XX, XXX |
| COURSE Y | SCREEN UPDATE PER SECOND | ARRIVAL OF NOTIFICATION WITHIN APPROX. 1 MINUTE | YY, YYY |
| COURSE Z | SCREEN UPDATE IN REAL TIME | ARRIVAL OF NOTIFICATION WITHIN SEVERAL SECONDS | ZZ, ZZZ | ium
INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2017-238489, filed on Dec. 13, 2017, the entire contents of which are incorporated herein by reference.

FIELD

The embodiment discussed herein is related to an information processing apparatus and an information processing method.

BACKGROUND

A service may be provided by calling a plurality of small services which are referred to as "micro services" through a web application programming interface (API) and operating the micro services in combination. When such micro services are used, a service provider is charged in accordance with a use state.

A user of a service usually creates a budget for use of the service in advance, and therefore, it is preferable that the service provider appropriately allocates a budget in the service. For example, a technique of collecting performance data by monitoring a use state of calculation resources of an agent and execution of processes performed by the agent and reallocating resources for the execution of the processes performed by the agent based on an evaluation result of the collected performance data has been used.

Related techniques are disclosed in, for example, Japanese Laid-open Patent Publication No. 2012-74056 and Japanese National Publication of International Patent Application No. 2009-536480.

When a sensor is used in such a micro service, various processes may be executed in a chained manner as a pipeline in response to a reception of a signal supplied from the sensor (a sensor event). A charge amount is mainly determined depending on executions of processes, and therefore, a charge amount may not be easily estimated in a service in which various processes are executed in a chained manner.

SUMMARY

According to an aspect of the present invention, provide is an information processing apparatus including a memory and a processor. The memory is configured to store records relating to logics included within a cloud computer platform. The logics are arranged in a chain graph. The records include information on past activation of each of the logics in a predetermined operation period. The logics perform event propagation in which each logic is activated by an input event to generate an output event which is to be input to another logic. The processor is coupled to the memory and configured to assign priority levels to the respective logics based on an importance level of at least one of the logics and a structure of the chain graph. The processor is configured to allocate tokens to the logics based on the priority levels. The tokens relate to a budget for using service resources of the logics in the predetermined operation period. The processor is configured to estimate for each of the logics, based on the records stored in the memory, a total number of generated output events to obtain an expected amount of tokens corresponding to the total number. The total number is an accumulated number of times each of the logics generates an output event in the predetermined operation period. The processor is configured to compare, for each of the logics, the expected amount of tokens to an amount of the allocated tokens to determine whether each of the logics has a surplus or a shortage in the allocated tokens. The processor is configured to adjust a frequency of activating each of logics having the shortage in the allocated tokens. The processor is configured to calculate a total amount of the surplus in the allocated tokens. The processor is configured to reallocate the total amount of the surplus to the logics having the shortage in the allocated tokens.

The object and advantages of the invention will be realized and attained by means of the elements and combinations particularly pointed out in the claims.

It is to be understood that both the foregoing general description and the following detailed description are exemplary and explanatory and are not restrictive of the invention

BRIEF DESCRIPTION OF DRAWINGS

FIG. 9 is a diagram illustrating an example of a data structure;

FIGS. 15A and 15B are diagrams illustrating a method for obtaining surplus resources;

FIG. 19 is a diagram illustrating an example of causes divided according to a degree of SLA.

DESCRIPTION OF EMBODIMENTS

Figure 1:
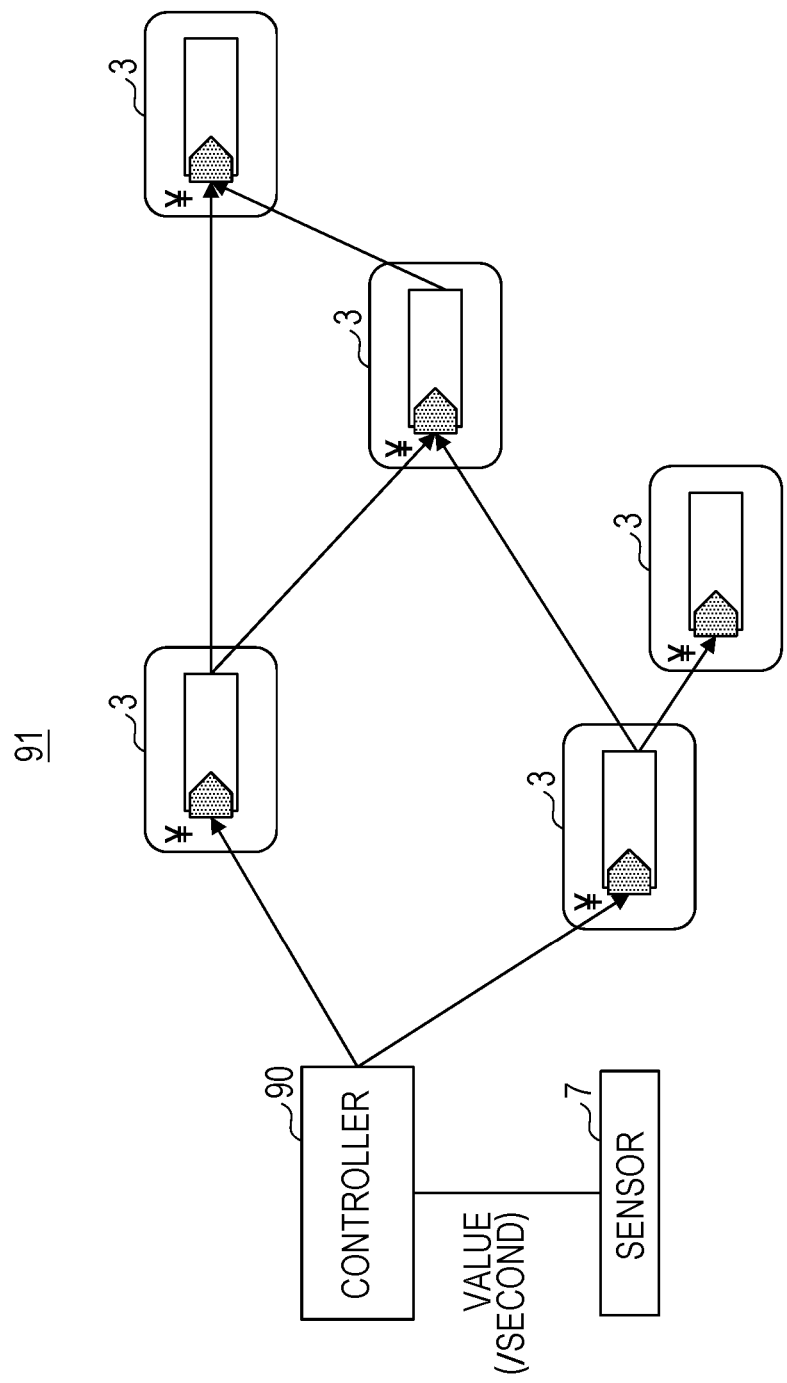
FIG. 1 is a diagram illustrating an example of a general micro service.

Hereinafter, an embodiment will be described with reference to the accompanying drawings. First, a micro service using a sensor will be described. FIG. 1 is a diagram illustrating an example of a general micro service. A micro service 91 illustrated in FIG. 1 includes a sensor 7, a controller 90, and a plurality of logics 3.

The sensor 7 is a device which detects a predetermined phenomenon and may be a speed sensor, a door sensor, a motion detector, a temperature sensor, a humidity sensor, an air pressure detector, an electromagnetic wave sensor, a biological information sensor, or the like. The controller 90 controls execution of the plurality of logics 3 included in the micro service 91 in response to a reception of a value detected by the sensor 7 and supplied from the sensor 7. Furthermore, the controller 90 may monitor a reception of a value (an event) supplied from the sensor 7 and obtain statistical information. The plurality of logics 3 are software which is executed under control of the controller 90 and which performs a predetermined process in response to an input signal (an input value), and correspond to plug-in software.

The sensor 7 and the plurality of logics 3 are capable of communicating with the controller 90 in a wireless manner or a wired manner. The controller 90 may individually control the plurality of logics 3 or may control an input of an event to a logic 3 which is a target of execution restriction.

The micro service 91 described above is not a vertical integration type and is realized by a micro service infrastructure which modularizes light processes to be performed on data and which drives a system by combining the modules.

In a general micro service infrastructure, a control process of the controller 90 and a specific process of the logics 3 are executed on a platform of cloud computing. Each of the logics 3 is a processing unit referred to as a "micro logic", and is simply referred to as a "logic" hereinafter. Then a user who is referred to as a servicer of the platform (a vendor who provides a service by combining a plurality of micro services) pays for a use fee of the micro logics to a platform provider (a platformer).

A micro logic is activated every time a specific event, such as a change of a value of the sensor 7, occurs and generates an output value after performing a predetermined process on the value of the sensor 7 which is received as an input. The output value is stored in a database (DB) which may be accessed by the platform or serves as an input event of another micro logic. That is, a micro logic is activated by an input event and generates an output event, which is an input event of another micro logic. The generation of an output event in response to an input event may be referred to as event propagation.

In the micro service 91, the plurality of logics 3 are chained over a plurality of stages in a complicated manner. A graph indicating a chain structure of logics is referred to as a "logic chain graph". A case where charge becomes high as a result of spread of an event in a chained manner will be described using the logic chain graph of FIG. 1.

Every time the controller 90 receives a value from the sensor 7, first, an event indicating data is supplied to two of the logics 3. Thereafter, data output from the two logics 3 spread in a chained manner over a plurality of stages in a complicated manner and is transmitted through the plurality of logics 3. In this example, the number of logics 3 is 5 and the number of times in which the logics 3 are activated is 8. In a case where the logics 3 are activated 8 times per second, the number of times the logics 3 are activated per day may be calculated as follows:

8 (an activation count)×60 seconds (for one minute)×60 minutes (for one hour)×24 hours (for one day)=604800

In a case where a unit value of driving of a logic 3 is 0.01 yen per activation, the unit value of driving is 6048 yen in 24 hours. However, if an event generation frequency (a frequency of generating an event) of the sensor 7 has not been obtained, a charge amount is difficult to be estimated, and therefore, is uncertain. Furthermore, although the case where one sensor 7 is used is illustrated in FIG. 1, a plurality of sensors 7 may be used. In this case, an estimation of the charge amount becomes further difficult.

In a case where a user sets an upper limit of a use fee in the existing micro service infrastructure described above, when the upper limit of the use fee is reached, a limiter state in which a service is stopped is entered even in course of an operation period. The upper limit of the use fee is a budget for one month, for example, and the operation period is one month, for example. A budget may be calculated or monitored in terms of tokens. The tokens being related to a budget for using service resources of logics within the micro service infrastructure.

In the micro service infrastructure, a charge amount is considerably varied with ease depending on a frequency of generation of an event or the like owing to the characteristic in which processes are chained, and therefore, it is difficult for the user to estimate the charge amount. Furthermore, the existing micro service is seemed to have difficulty in use for the user since the limiter state is entered in course of a scheduled operation period.

Cost-saving driving is preferable so that the user may continuously receive services within a range of a budget in accordance with a plan of the budget of the user. In this embodiment, an information processing apparatus which performs control for continuously driving a micro service within the range of the budget of the user, instead of a charge as a result of driving, is disclosed.

In this embodiment, driving control of a micro service is performed based on the following policies. —In the micro service infrastructure, "service level agreement (SLA) associated with driving quality" is varied under control depending on a budget of a user. —SLA specifies a degree of reaction of a logic 3 relative to an event (real-time property). —An importance level of at least one main logic 3 is determined, the importance level is reversely spread in a logic chain graph, and a budget is allocated into the plurality of logics 3 based on the importance level. —Event arrival frequencies of the plurality of logics 3 are modeled and activation frequencies of the logics 3 are adjusted after the budget and an estimation value are compared with each other. —Surplus budgets of the individual logics 3 are collected (obtained) and the collected (obtained) surplus budgets are reallocated into the logics 3 in which the activation frequencies are adjusted (budgets are lacked) based on the estimated value.

By realizing control based on the policies described above by information processing, a micro service may be continuously used within the budget planned by a user. A micro service which avoids an additional charge paid due to a concern for stop of the service caused by overlimit of a use fee and which attains low cost is realized for a user. Furthermore, flexible scalability which avoids a change of service design, such as a change of content of a logic 3, in accordance with an amount of a budget is realized for a platform provider and a development load is reduced.

Figure 2:
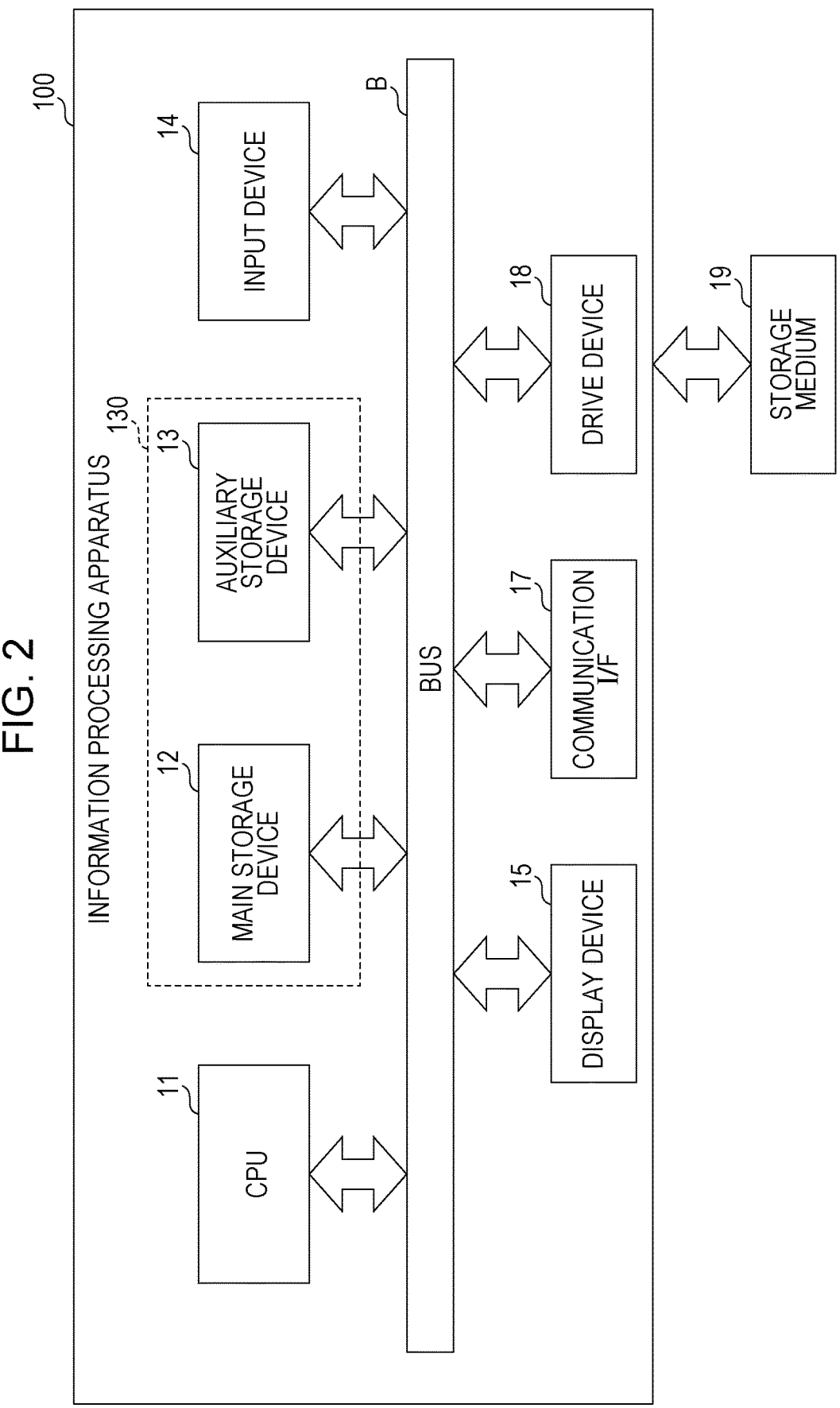
FIG. 2 is a diagram illustrating a hardware configuration of an information processing apparatus.

Hereinafter, an embodiment will be described. An information processing apparatus 100 according to this embodiment has a hardware configuration as illustrated in FIG. 2. FIG. 2 is a diagram illustrating a hardware configuration of the information processing apparatus 100. In FIG. 2, the information processing apparatus 100 includes a central processing unit (CPU) 11, a main storage device 12, an auxiliary storage device 13, an input device 14, a display device 15, a communication interface (I/F) 17, and a drive device 18 which are connected to a bus B.

The CPU 11 corresponds to a processor which controls the information processing apparatus 100 in accordance with programs stored in the main storage device 12. The main storage device 12 is a random access memory (RAM) or a read only memory (ROM) and stores or temporarily saves data to be used in processes performed by the CPU 11, data obtained by processes performed by the CPU 11, and the like data.

The auxiliary storage device 13 is a hard disk drive (HDD) or the like and stores data, such as programs, to be used for executing various processes. Some of the programs stored in the auxiliary storage device 13 are loaded in the main storage device 12 and executed by the CPU 11 so that various processes are realized. The main storage device 12 and the auxiliary storage device 13 are included in a storage unit 130. The storage unit 130 may include an accessible external storage device and the like.

The input device 14 includes a mouse and a keyboard and is used to input various pieces of information to be used by a platform provider or the like in processes performed by the information processing apparatus 100. The display device 15 displays various pieces of information to be used under control of the CPU 11. The input device 14 and the display device 15 may be an integrated user interface constituted by a touch panel or the like. The communication I/F 17 communicates with the sensor 7 through a network in a wired manner or a wireless manner. The communication performed by the communication I/F 17 is not limited to wireless or wired communication.

The programs which realize the processes to be performed by the information processing apparatus 100 are supplied to the information processing apparatus 100 through a storage medium 19, such as a compact disc read-only memory (CD-ROM), for example.

The drive device 18 serves as an interface between the information processing apparatus 100 and the storage medium 19 (such as a CD-ROM) set in the drive device 18. The programs stored in the storage medium 19 are installed in the information processing apparatus 100 through the drive device 18 and are executable by the information processing apparatus 100.

The storage medium 19 which stores the programs is not limited to a CD-ROM as long as the storage medium 19 is at least one computer-readable structured non-transitory tangible medium. Examples of the computer readable storage medium include, in addition to the CD-ROM, a digital versatile disk (DVD), a mobile recording medium, such as a universal serial bus (USB) memory, or a semiconductor memory, such as a flash memory.

Figure 3:
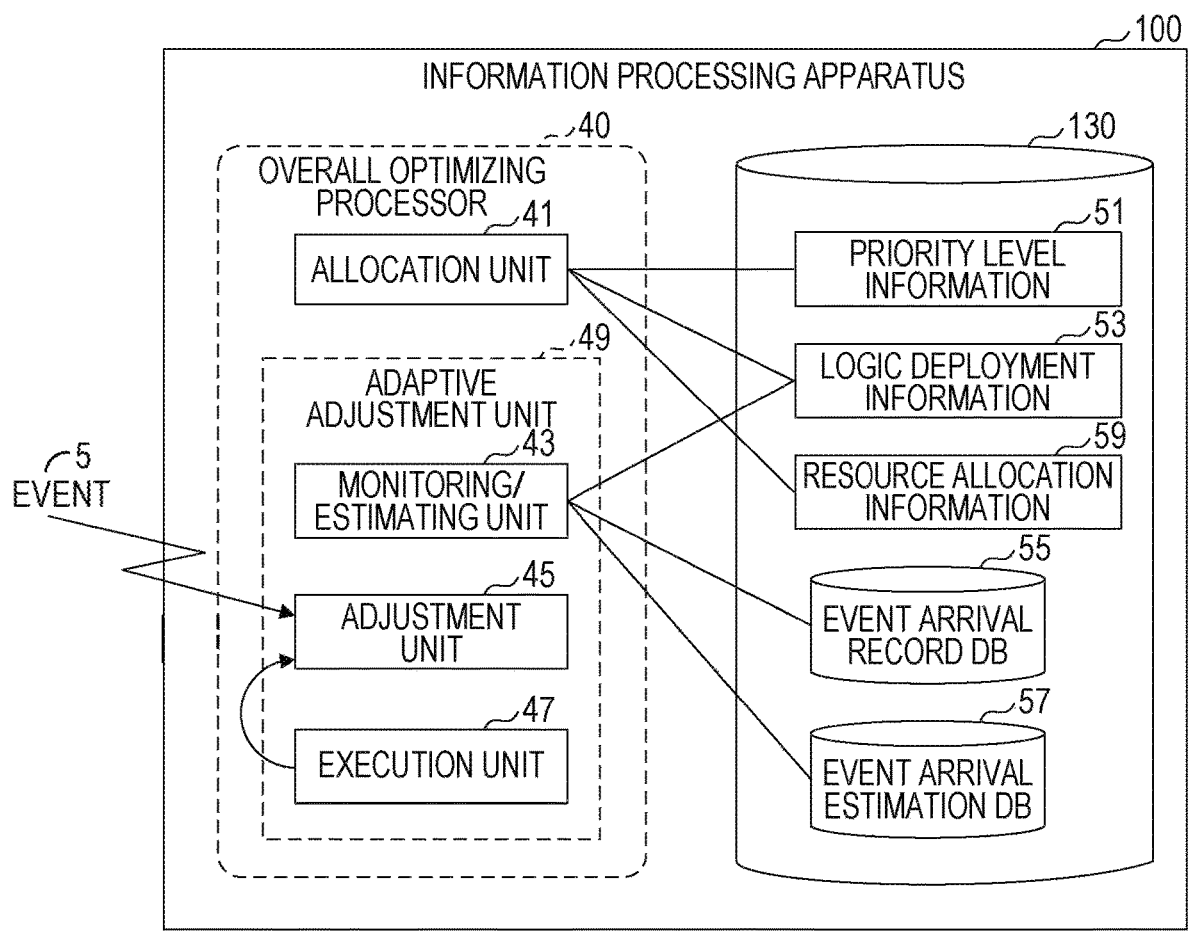
FIG. 3 is a diagram illustrating an example of a functional configuration of the information processing apparatus according to this embodiment.

FIG. 3 is a diagram illustrating an example of a functional configuration of the information processing apparatus 100 according to this embodiment. In FIG. 3, the information processing apparatus 100 mainly includes an overall optimizing processor 40 according to this embodiment which includes a plurality of processors including an allocation unit 41, a monitoring/estimating unit 43, an adjustment unit 45, and an execution unit 47. The monitoring/estimating unit 43, the adjustment unit 45, and the execution unit 47 are included in an adaptive adjustment unit 49.

The processors 41, 43, 45, 47, and 49 are realized by processes executed by the CPU 11 of the information processing apparatus 100 in accordance with programs installed in the information processing apparatus 100.

The storage unit 130 stores priority level information 51, logic deployment information 53, an event arrival record DB 55, an event arrival estimation DB 57, and resource allocation information 59.

The overall optimizing processor 40 controls activation of the logics 3 within a range of a budget of a user so as to entirely control a micro service 1001 (FIG. 11) of this embodiment so as to be continuously operable in an operation period. The processors 41, 43, 45, 47, and 49 of the overall optimizing processor 40 will be briefly described.

The allocation unit 41 sets priority levels to all the logics 3 based on a logic 3 which is regarded as important by the user. The allocation unit 41 obtains a logic ID and an importance level of the logic 3 which is regarded as important by the user. The logic ID identifies the logic 3. The allocation unit 41 sets priority levels to all the logics 3 in accordance with the importance level and the logic ID. The priority level information 51 including the logic ID and the priority levels is stored in the storage unit 130.

Furthermore, the allocation unit 41 determines an allocation ratio of resources for each logic 3 with reference to the logic deployment information 53 and the priority level information 51. A priority level determination process is performed by the allocation unit 41 when a calculation is performed for the first time in the operation period, and the allocation unit 41 corresponds to an example of a priority level determination unit. The resource allocation information 59 is stored in the storage unit 130.

The monitoring/estimating unit 43 monitors an arrival of an event 5 for each logic 3 by receiving a notification indicating an arrival of the event 5 from the logic 3 and performs accumulation estimation of the number of times the event 5 arrives in the operation period. The event 5 corresponds to a notification indicating a value from the sensor 7 or an output from a logic 3 to a next logic 3. The monitoring/estimating unit 43 updates the event arrival record DB 55 in accordance with the notification indicating the arrival of the event 5 supplied from each of the logics 3.

The operation period is a period on a daily basis, a monthly basis, a yearly basis, or the like to which a budget of the user is applied. The accumulation estimation of arrivals of the event 5 is indicated by a straight line or the like which represents transition of the number of times the event 5 arrives obtained by accumulating the number of times the event 5 arrives in a period from a starting day of the operation period to an ending day of the operation period (that is, a first day of a period of a predetermined unit to a last day of the period) and is also referred to as an "arrival estimation model".

Furthermore, the monitoring/estimating unit 43 performs the accumulation estimation of the number of times the event 5 arrives in the operation period with reference to the event arrival record DB 55, determines possibility of overuse of the resources based on the resource allocation information 59, and determines an execution inhibition count for ignoring a notification of the event 5. The monitoring/ estimating unit 43 generates a result of the determination of the overuse of the resources indicating the execution inhibition count for each logic 3 corresponding to estimated overuse of the resources and transmits the result to the adjustment unit 45.

The adjustment unit 45 performs control of the execution or the inhibition of the logic 3 when the event 5 has arrived based on the result of the determination of the overuse of resources transmitted from the monitoring/estimating unit 43. Furthermore, the adjustment unit 45 transmits a notification indicating the arrival of the event 5 to the monitoring/estimating unit 43. The execution unit 47 activates the logic 3 when the adjustment unit 45 determines that the logic 3 is to be activated.

The allocation unit 41 collects a surplus of the budget (hereinafter referred to as "surplus resources" from the individual logics 3 and performs a surplus resource allocation process of allocating the resources to the logics 3 which are lack of the resources.

Figure 4:
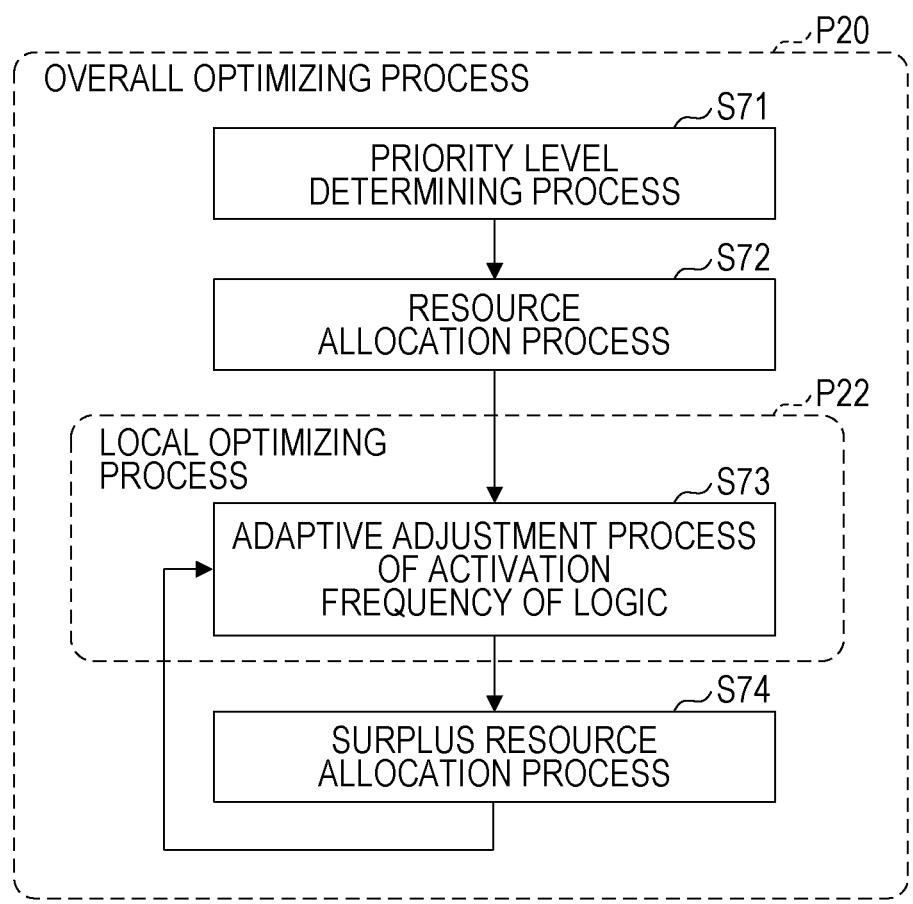
FIG. 4 is a flowchart briefly illustrating an entire process of the information processing apparatus according to this embodiment.

FIG. 4 is a flowchart briefly illustrating an entire process performed by the information processing apparatus 100 according to this embodiment. In the information processing apparatus 100, the allocation unit 41 performs the priority level determination process of determining priority levels of all the logics 3 based on the logic 3 which is regarded as important by the user (step S71). The importance level is set to at least one of the plurality of logics by the user, that is, importance levels may not set to all the logics. The allocation unit 41 stores the priority level information 51 including the logic ID and the priority levels in the storage unit 130.

The allocation unit 41 performs a resource allocation process of allocating resources with reference to the logic deployment information 53 (step S72). The resource allocation process is performed when the process is performed for the first time, and the allocation unit 41 generates the resource allocation information 59 to be stored in the storage unit 130 with reference to the logic deployment information 53 and the priority level information 51.

The monitoring/estimating unit 43, the adjustment unit 45, and the execution unit 47 perform an adaptive adjustment process on a logic activation frequency (step S73). The monitoring/estimating unit 43 estimates a tendency to increase in the number of times an event arrives for each logic, and the adjustment unit 45 calls the execution unit 47 so as to activate the logic in frequency corresponding to a result of the estimation.

The allocation unit 41 accumulates surplus resources of the logics at a predetermined time interval and performs a surplus resource allocation process of allocating the surplus resources to logics in which an activation frequency is adjusted (step S74). The allocation unit 41 updates the resource allocation information 59.

Then the process in step S73 and step S74 is repeatedly performed until an ending day of the operation period to which the budget is allocated, and the resource allocation information 59 is newly generated for each operation period. If the user does not update the importance level every operation period, the priority level information 51 which is set for the first time may be associated with identification information of the user or the like as prescribed values of priority levels and may be independently managed, and the priority level information 51 which has been independently managed may be read every time the operation period is started. In this case, the priority level determination process in step S71 is omitted.

Roles of the monitoring/estimating unit 43, the adjustment unit 45, the execution unit 47, and the allocation unit 41 in the flowchart will be described.

Figure 5:
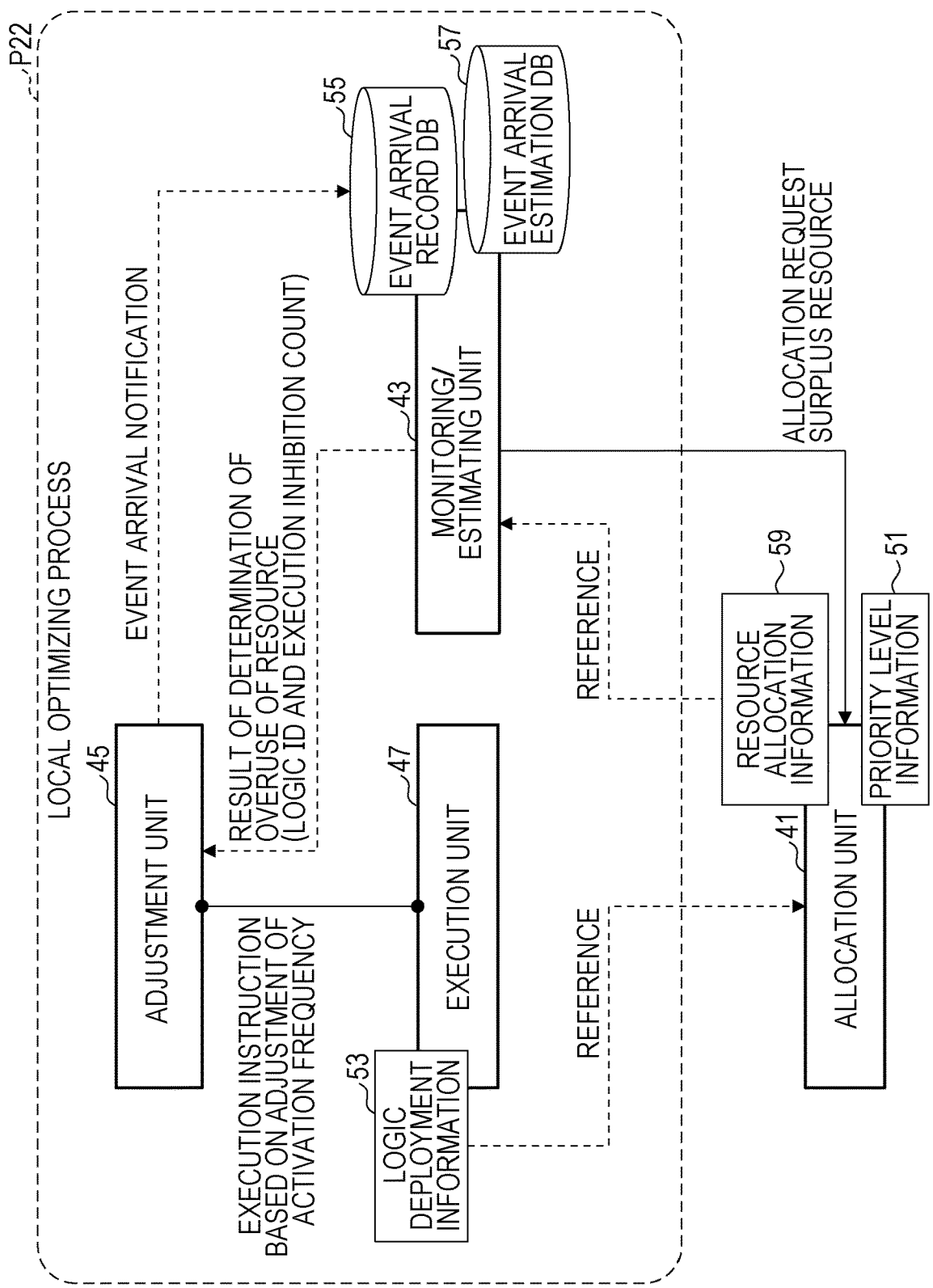
FIG. 5 is a diagram illustrating a flow of a process.

FIG. 5 is a diagram illustrating a processing flow. In FIG. 5, the allocation unit 41 determines priority levels of all the logics based on a logic selected by the user and an importance level specified by the user. Then the priority level information 51 is generated.

When the operation is actually started by the user, an event 5 which is generated in a logic and which is supplied to a logic in a next stage is detected by the adjustment unit 45 in accordance with a notification of a value supplied from the sensor 7.

The adjustment unit 45 receives a result of a determination of overuse of resources from the monitoring/estimating unit 43. The adjustment unit 45 does not execute logics corresponding to shortage of the resources which are identified as a result of the determination of the overuse of the resources until an execution inhibition counter which counts the number of times execution is inhibited reaches the execution inhibition count. When the logics are to be executed, the adjustment unit 45 issues an instruction for executing the logics to the execution unit 47. The execution instruction includes content of the event 5.

Furthermore, when detecting the event 5, the adjustment unit 45 transmits a notification indicating the arrival of the event 5 to the monitoring/estimating unit 43 and increments, by one, an event arrival count of the logic which is a destination of the notification of the event 5 included in the event arrival record DB 55. The increment of the arrival count may be performed after a logic of a notification destination is executed.

The execution unit 47 executes the logic of the notification destination of the event 5 based on the content of the event 5 in response to the execution instruction issued by the adjustment unit 45. The execution unit 47 identifies a logic of a connection destination as a notification destination of data obtained by the execution of the logic with reference to the logic deployment information 53 and generates the event 5. The process to be performed after the event 5 is generated is described as above.

The monitoring/estimating unit 43 updates the event arrival record DB 55 in response to the event arrival notification supplied from the adjustment unit 45. Furthermore, the monitoring/estimating unit 43 generates an arrival estimation model for each logic using the event arrival record DB 55 and stores the model in the event arrival estimation DB 57.

Then the monitoring/estimating unit 43 determines whether overuse of resources has occurred or surplus resources exist for each logic with reference to the event arrival estimation DB 57 at a monitoring time interval. The monitoring/estimating unit 43 determines the execution inhibition count for each logic in which the overuse of resources is estimated and generates a result of the determination of the overuse of the resources to be transmitted to the adjustment unit 45. On the other hand, when at least one of the logic has surplus resources, the monitoring/estimating unit 43 transmits a surplus resource allocation request indicating an amount of the surplus resources for each logic ID of the logic having the surplus resources to the allocation unit 41.

Figure 6:
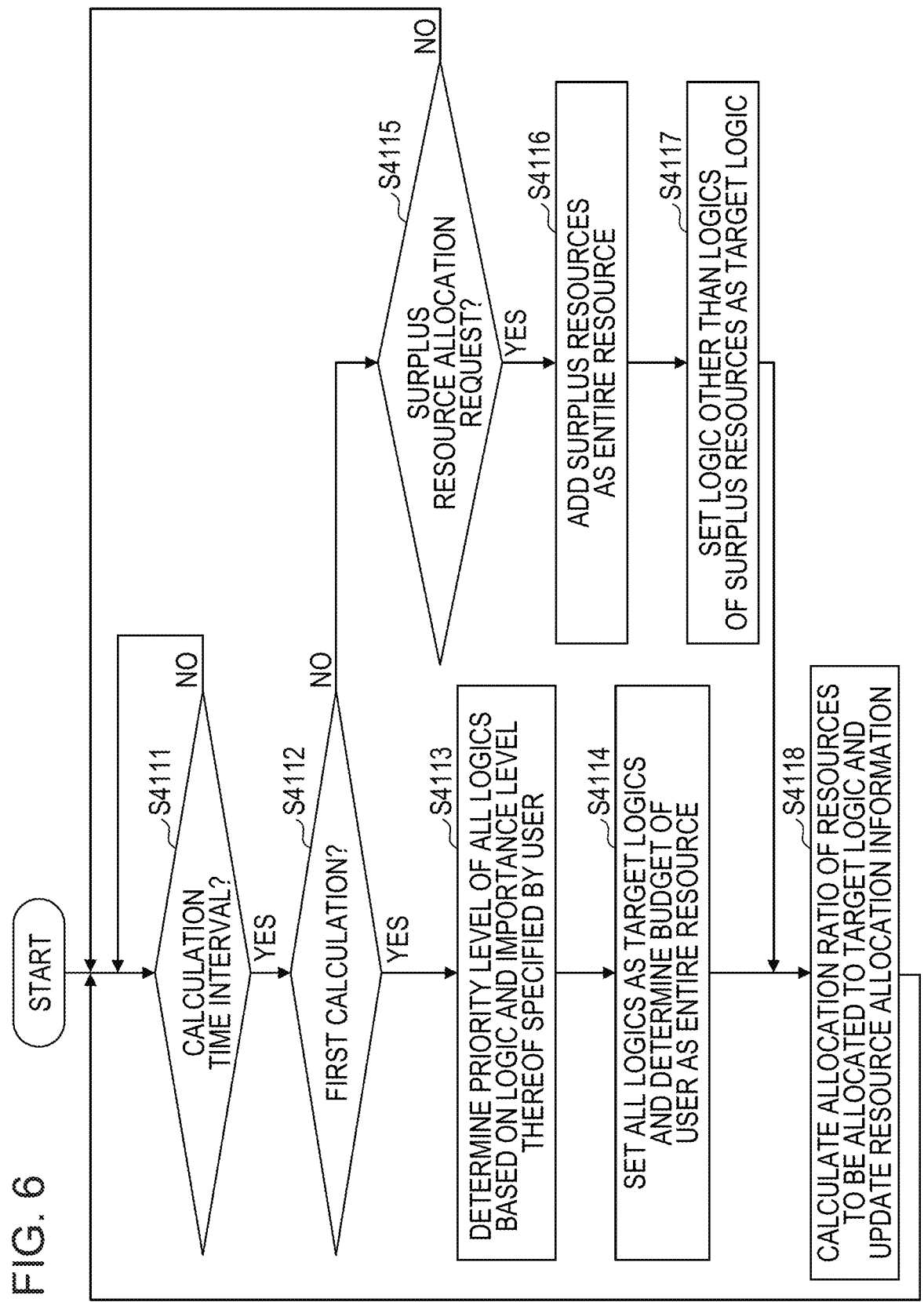
FIG. 6 is a flowchart of a process performed by an allocation unit.

FIG. 6 is a flowchart of a process performed by the allocation unit 41. In FIG. 6, a process in step S4113 and step S4114 corresponds to the priority level determination process performed in step S71 of FIG. 4, and a process in step S4118 corresponds to the resource allocation process performed in step S72 of FIG. 4. A process in step S4116 to step S4118 corresponds to the surplus resource allocation process performed in step S74 of FIG. 4.

The allocation unit 41 determines whether a calculation time interval has elapsed (step S4111). When the determination is negative (NO in step S4111), the allocation unit 41 repeatedly performs the process in step S4111 until the calculation time interval has elapsed. On the other hand, when the determination is affirmative (YES in step S4111), the allocation unit 41 determines whether calculation is performed for the first time (step S4112).

When the determination is affirmative (YES in step S4112), the allocation unit 41 determines priority levels of all the logics with reference to the logic deployment information 53 based on the logic and the importance level thereof specified by the user (Step S4113). A method for determining priority levels will be described hereinafter. The priority level information 51 is generated and is stored in the storage unit 130.

Then the allocation unit 41 sets all the logics as targets to which the resources are to be allocated and determines the budget of the user as all resource (step S4114). The allocation unit 41 calculates allocation ratios of the resource to be allocated to the target logics, updates the resource allocation information 59 (step S4118), and returns to step S4111 where the process described above is similarly performed again.

When the determination is negative (NO in step S4112), the allocation unit 41 determines whether to have received the surplus resource allocation request from the monitoring/estimating unit 43 (step S4115). When the determination is negative (NO in step S4115), the allocation unit 41 returns to step S4111 where the process described above is performed again.

When the determination is affirmative (YES in step S4115), the allocation unit 41 obtains a sum of the surplus resources of the individual logics 3 as all resource (step S4116). The allocation unit 41 sets logics other than the logics having the surplus resources as target logics (step S4117). The allocation unit 41 calculates allocation ratios of the resource to be allocated to the target logics, updates the resource allocation information 59 (step S4118), and terminates the process.

Figure 7:
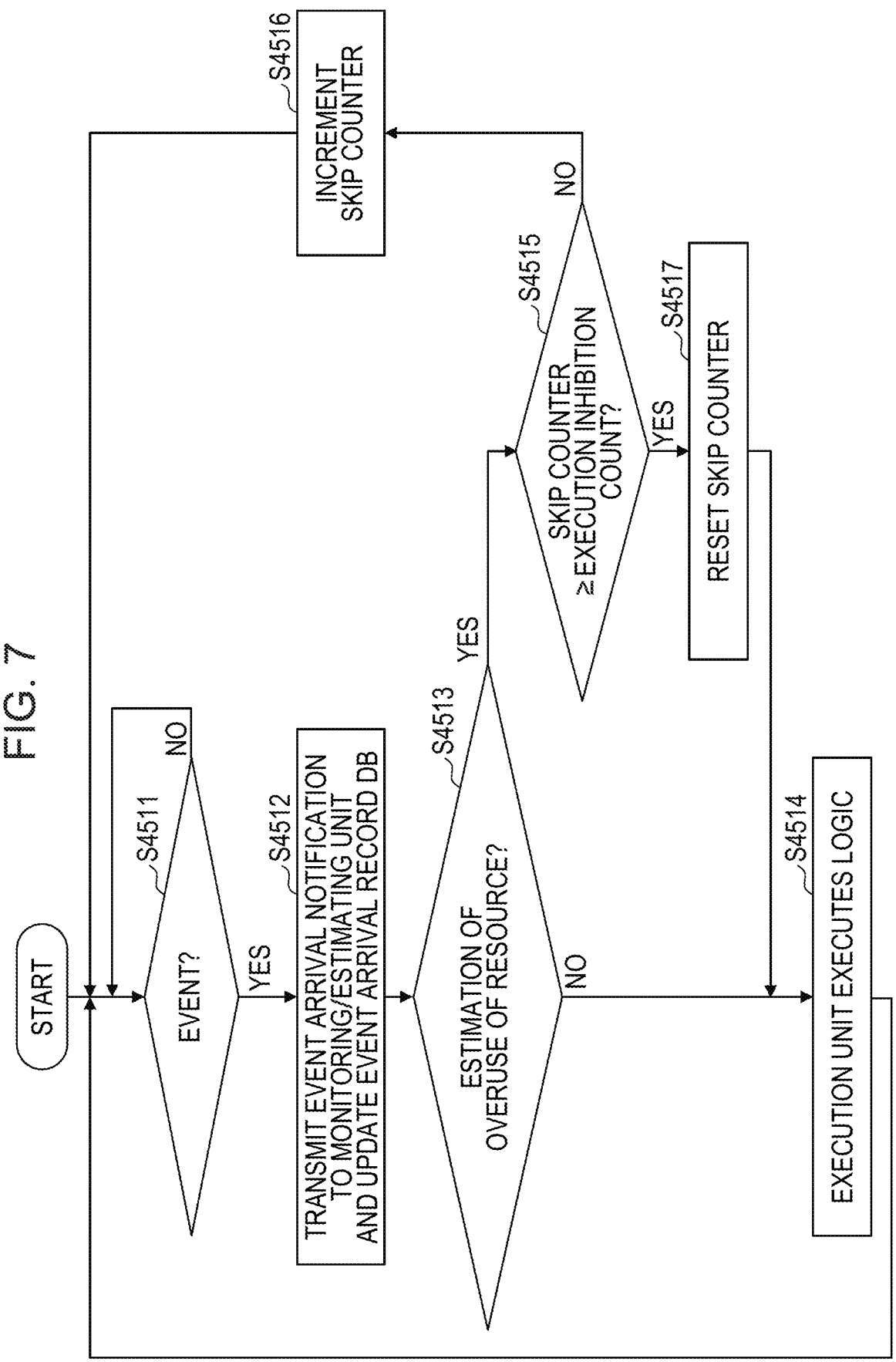
FIG. 7 is a flowchart of a logic execution control process performed by an adjustment unit.

FIG. 7 is a flowchart of a logic execution control process performed by the adjustment unit 45. In FIG. 7, the adjustment unit 45 determines whether an event has arrived (step S4511). When the determination is negative (NO in step S4511), the adjustment unit 45 repeatedly performs the process in step S4511 at a predetermined interval.

When the determination is affirmative (YES in step S4511), the adjustment unit 45 transmits an event arrival notification to the monitoring/estimating unit 43 and updates the event arrival record DB 55 (step S4512).

Subsequently, the adjustment unit 45 determines whether the logic in which the event has arrived corresponds to estimated overuse of resources (step S4513). The adjustment unit 45 determines whether a latest result of the determination of the overuse of resources supplied from the monitoring/estimating unit 43 includes the logic in which the event has arrived.

When the determination is negative (NO in step S4513), the adjustment unit 45 causes the execution unit 47 to execute the logic in which the event has arrived (step S4514). After the execution unit 47 executes the logic, the adjustment unit 45 returns to step S4511 and the process described above is performed again.

When the determination is affirmative (YES in step S4513), the adjustment unit 45 further determines whether a skip counter has reached the execution inhibition count supplied from the monitoring/estimating unit 43 (step S4515).

When the determination is negative (NO in step S4515), the adjustment unit 45 increments the skip counter (step S4516) and the process returns to step S4511 where the process described above is performed again. When the determination is affirmative (YES in step S4515), the adjustment unit 45 resets the skip counter (step S4517) and causes the execution unit 47 to execute the logic in which the event has arrived (step S4514). After the execution unit 47 executes the logic, the adjustment unit 45 returns to step S4511 and the process described above is performed again.

Figure 8:
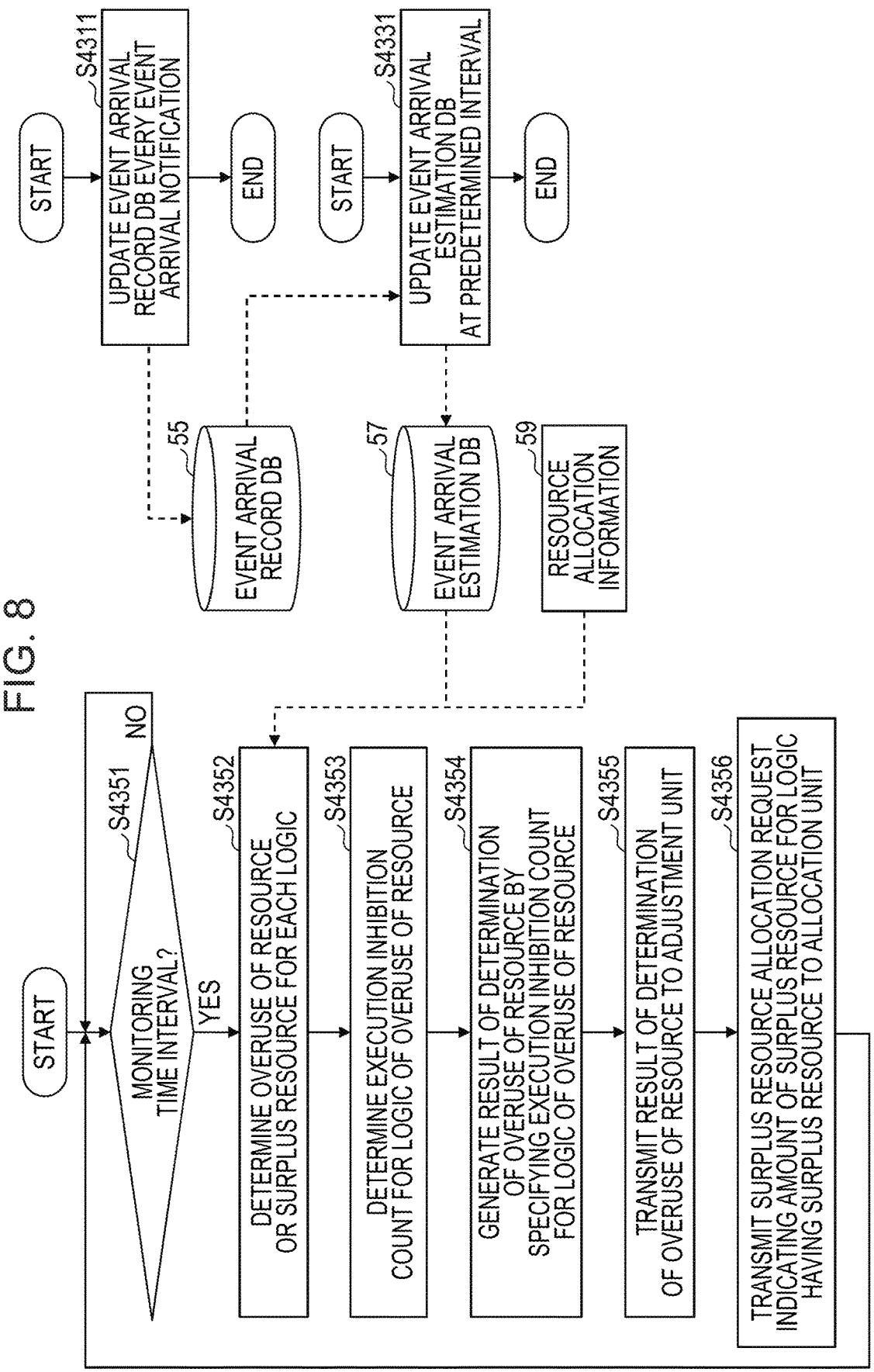
FIG. 8 is a flowchart of a process performed by a monitoring/estimating unit.

FIG. 8 is a flowchart of a process performed by the monitoring/estimating unit 43. In FIG. 8, every time the monitoring/estimating unit 43 receives an event arrival notification, the monitoring/estimating unit 43 updates the event arrival record DB 55 (step S4311). Furthermore, the monitoring/estimating unit 43 updates the event arrival estimation DB 57 at a predetermined interval (step S4331).

Meanwhile, the monitoring/estimating unit 43 determines whether a monitoring time interval has elapsed (step S4351). When the determination is negative (NO in step S4351), the monitoring/estimating unit 43 performs the process in step S4351 again.

When the determination is affirmative (YES in step S4351), the monitoring/estimating unit 43 determines whether overuse of resources occurs or a surplus resource exists for each logic (step S4352). The monitoring/estimating unit 43 determines an upper limit (corresponding to a budget threshold value 87 of FIGS. 14A and 14B) of the resource for each logic using the resource allocation information 59 and determines whether the overuse of resource has occurred or a surplus resource exists in accordance with the arrival estimation model of each logic included in the event arrival estimation DB 57 and the determined upper limit.

Thereafter, the monitoring/estimating unit 43 determines the execution inhibition count for each logic in which overuse of a resource occurs (step S4353) and generates a result of the determination of the overuse of a resource in which the execution inhibition count is specified (step S4354). The monitoring/estimating unit 43 notifies the adjustment unit 45 of the obtained result of the determination of the overuse of a resource (step S4355).

Furthermore, the monitoring/estimating unit 43 transmits a surplus resource allocation request indicating an amount of the surplus resource for each logic having the surplus resource to the allocation unit 41 (step S4356). Then the monitoring/estimating unit 43 returns to step S4351 and performs the process described above again.

FIG. 9 is a diagram illustrating examples of data structures. In FIG. 9, a case where a micro service includes five logics is illustrated, and the number of logics, values, and the like are not limited to this example.

The priority level information 51 corresponds to a table in which priority levels of individual logics 3 are recorded and has items of a logic ID and a priority level. The logic ID is identification information for uniquely identifying a logic. The priority levels are determined by the allocation unit 41.

The logic deployment information 53 corresponds to a table indicating logics 3 on an input side and logics 3 on an output side and has items of a logic ID, an input logic ID, and an output logic ID list. The logic ID is as described above. The input logic ID indicates a logic ID of a logic connection source and the output logic ID list indicates a logic ID of a logic connection destination. If a plurality of logics serve as connection destinations, logic IDs of all the logics are described.

The event arrival record DB 55 is a table which records an event arrival count for each logic 3 and has items of a logic ID and the arrival count (times). The logic ID is as described above. The arrival count (times) is incremented by one when the event arrival notification is supplied from the adjustment unit 45. The arrival count (times) indicates an accumulated count of event arrivals until a current time point in the operation period.

The event arrival estimation DB 57 is a table which indicates an estimated arrival count for each logic 3 and has items of a logic ID and the estimated arrival count (per minute). The logic ID is as described above. The estimated arrival count (per minute) indicates an estimated value of the event arrival count obtained at an end of the operation period and is updated every one minute.

The resource allocation information 59 is a table indicating allocation ratios determined by the allocation unit 41 based on the entire resource to be used in the operation period and the priority level information 51 for each logic 3 and has items of a logic ID and an allocation ratio. The logic ID is as described above. The allocation ratio indicates a ratio of a resource to be allocated to a logic.

Next, an example of processes performed by the processors 41, 43, 45, and 47 will be described. First, a method for determining a priority level will be described with reference to FIGS. 10 and 11.

Figure 10:
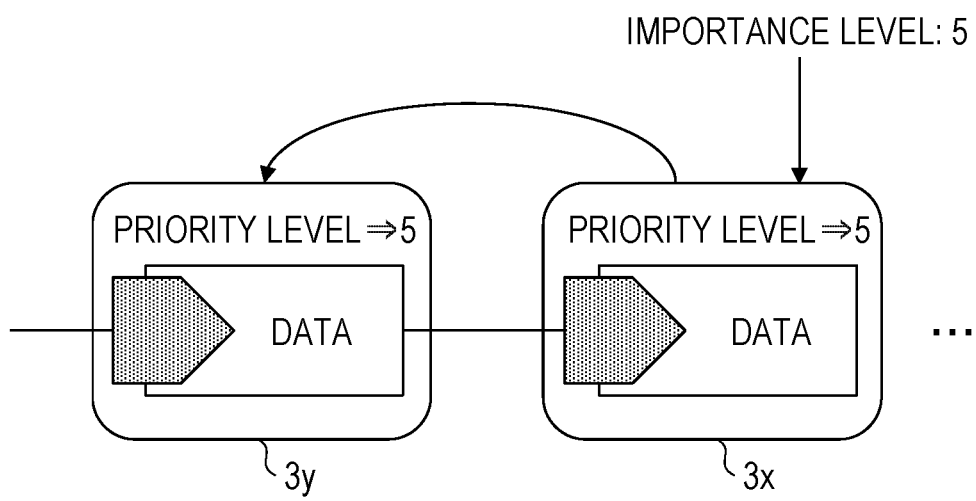
FIG. 10 is a diagram illustrating a basic method for determining a priority level based on an importance level.

FIG. 10 is a diagram illustrating a basic method for determining a priority level based on an importance level. The importance level of the logic 3 varies depending on a user and SLA of logics are finely differentiated within the range of the budget of the user. However, to set importance levels to individual logics by the user is a burden for the user.

In this embodiment, the user selects at least one logic regarding as important and sets an importance level only to the selected logic. The allocation unit 41 determines priority levels of all the logics based on the logic selected by the user and the importance level set by the user. The priority levels are determined taking links of the logics into consideration with reference to the logic deployment information 53.

Basically, if requested quality of a certain logic is high, quality of a logic which is an input source of the certain logic is also high. A priority level corresponding to the importance level set by the user is set to the logic by reversed event propagation from the logic selected by the user.

In the example of FIG. 10, in a case where the user sets an importance level of 5 to a logic 3$x$, a priority level of 5 is set to the logic 3$x$ and a priority level of 5 is set to a logic 3$y$ linked to an input side of the logic 3$x$. Next, a method for determining priority levels employed in a case where the user sets importance levels to at least two logics 3 will be described.

Figure 11:
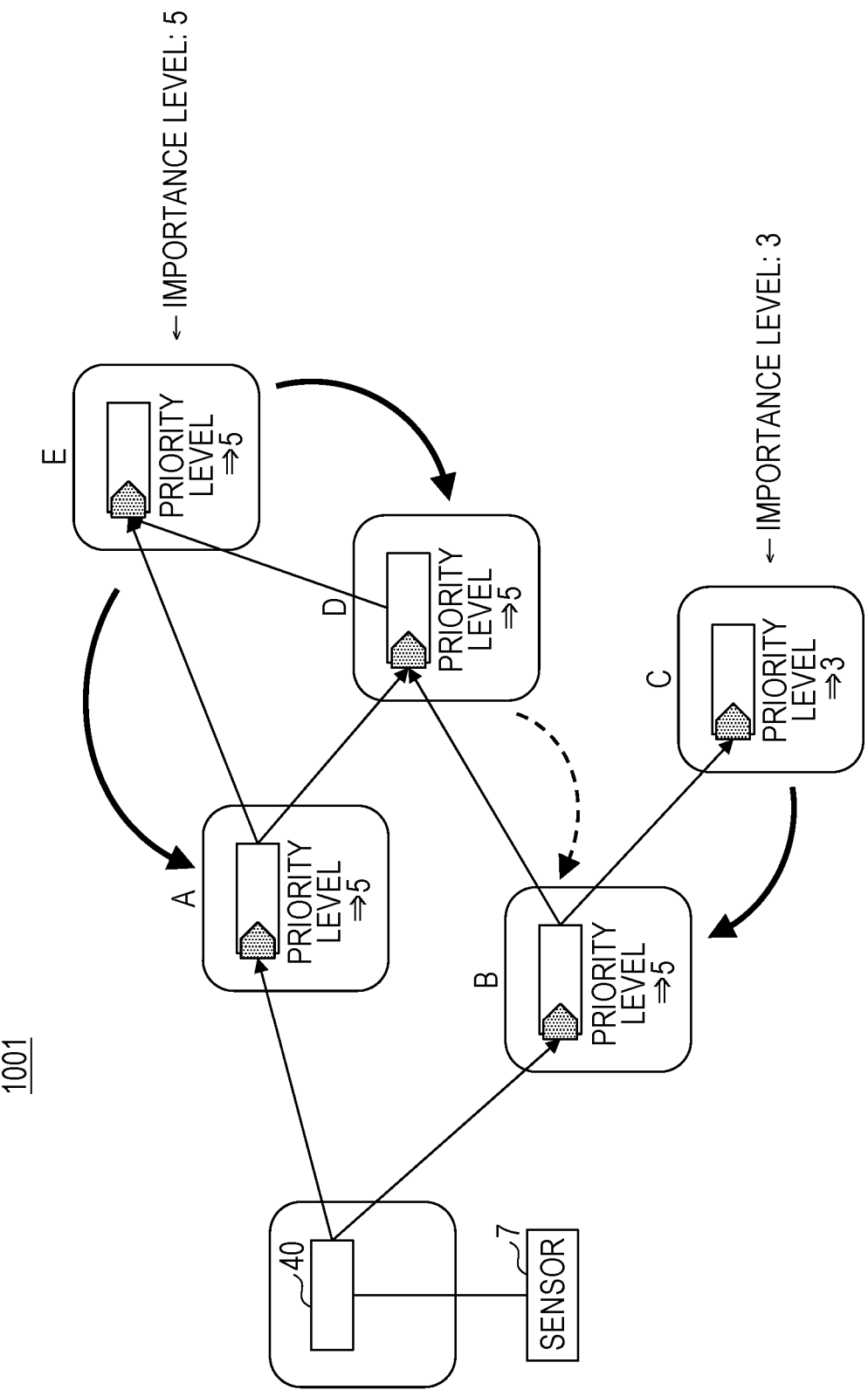
FIG. 11 is a diagram illustrating a method for determining priority levels based on importance levels of at least two logics.

FIG. 11 is a diagram illustrating a method for determining priority levels based on importance levels of at least two logics. In the following description, logics A to E correspond to the logics 3. In a micro service 1001 of FIG. 11, the event 5 supplied from the sensor 7 is transmitted to the logics A and B under activation control of the overall optimizing processor 40 according to a logic chain graph based on the logic deployment information 53.

The logics D and E are connection destinations of the logic A which receives the event 5 from the sensor 7, and the logic E is a connection destination of the logic D. Specifically, the logics A and D are connection sources of the logic E. Furthermore, the logics D and C are connection destinations of the logic B which receives the event 5 from the sensor 7. Accordingly, the logics A and B are connection sources of the logic D.

It is assumed that the user specifies an importance level 5 to the logic E and an importance level 3 to the logic C. In this case, priority levels of the other logics A, B, and D are determined based on the logics E and C having the importance levels determined by the user through reversed event propagation. A case where priority levels 1 to 5 are set so as to correspond to values of importance levels, that is, importance levels 1 to 5, will be described. A value 1 indicates a lowest importance level and a lowest priority level and a value 5 indicates a highest importance level and a highest priority level. Note that the values of the importance levels and the priority levels and the correspondences between the importance levels and the priority levels are not limited to this example.

A priority level of 5 corresponding to the importance level of 5 is set to the logic E selected by the user and reversed event propagation is performed from the logic E serving as a starting point. A priority level of 5 is set to the logic A which is the connection source of the logic E, and the reversed event propagation from the logic A is not performed since the connection source of the logic A is the overall optimizing processor 40. Meanwhile, a priority level of 5 is set to the logic D which is the connection source of the logic E. Furthermore, a priority level of 5 is set to the logic B which is the connection source of the logic D. The reversed event propagation from the logic B is not performed since the connection source of the logic B is the overall optimizing processor 40.

A priority level of 3 corresponding to the importance level of 3 is set to the logic C selected by the user and reversed event propagation is performed from the logic C serving as a starting point. A priority level of 3 is set to the logic B which is the connection source of the logic C, and the reversed event propagation from the logic B is not performed since the connection source of the logic B is the overall optimizing processor 40.

However, the priority level of 5 is set to the logic B based on the priority level of the logic D which is one of the connection destinations whereas the priority level of 3 is set to the logic B based on the priority level of the logic C which is the other of the connection destinations, and therefore, the priority levels mismatch. When such mismatch of the priority levels occurs, a higher priority level is preferentially set. That is, the priority level of 5 is set to the logic B.

Figure 12:
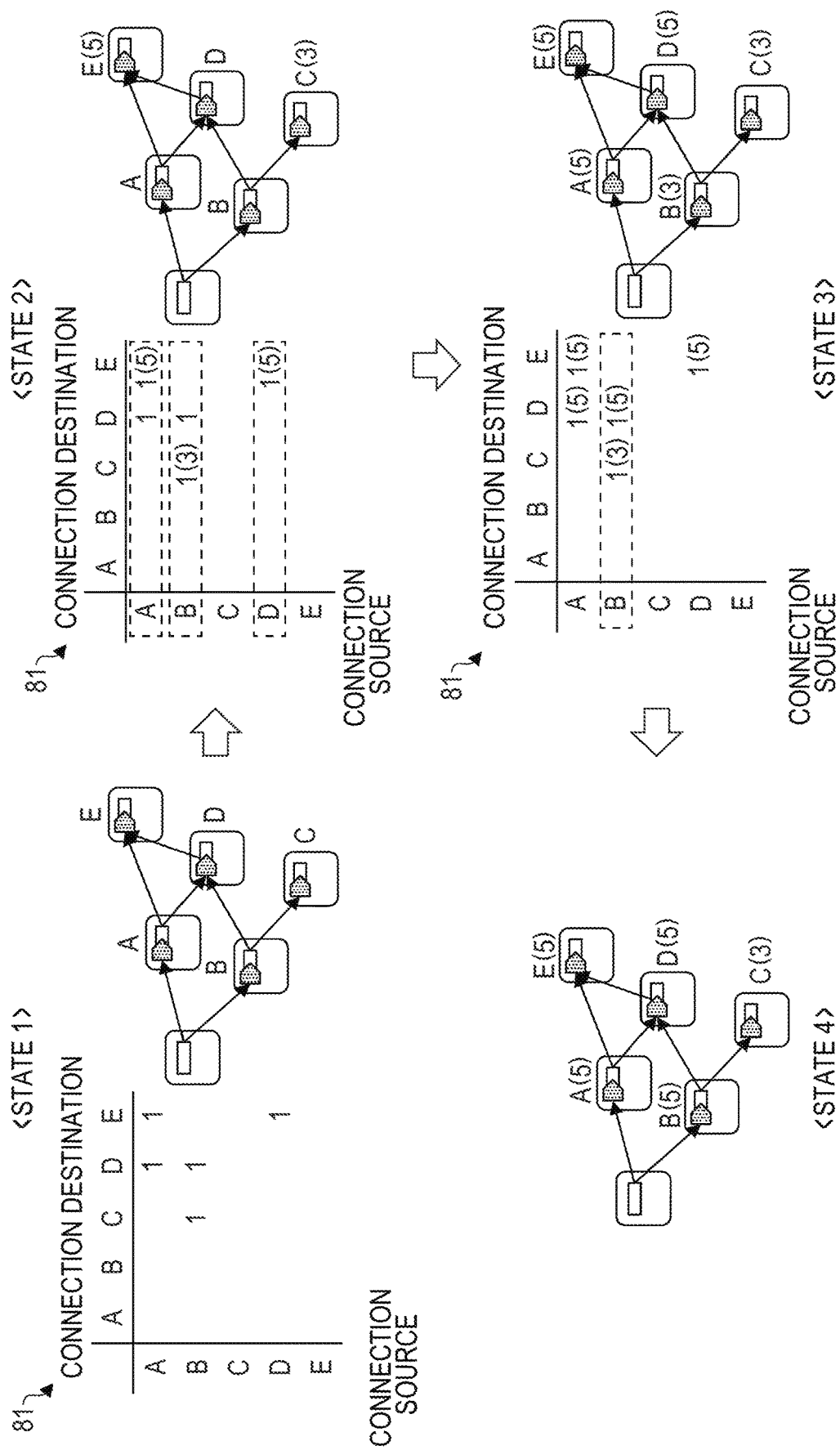
FIG. 12 is a diagram illustrating a concrete example of a priority level determination process performed by the allocation unit.

Furthermore, the priority level determination process performed by the allocation unit 41 based on the priority level determination method using the reversed event propagation illustrated in FIG. 11 will be described in detail. FIG. 12 is a diagram illustrating a concrete example of the priority level determination process performed by the allocation unit 41. In FIG. 12, a connection matrix 81 indicates the connection relationships among the logics 3 based on the logic deployment information 53.

In a first state, in the connection matrix 81, 1 is set to logics serving as connection destinations in a case where the logics A to E serve as connection sources.

In a second state, the allocation unit 41 sets importance levels set by the user to the logics C and E specified by the user as priority levels. Although the importance level corresponds to the priority level in this example, the importance level and the priority level may not correspond to each other.

For example, priority levels may be more finely set relative to the importance levels. That is, a priority level for an importance level is set.

Then the allocation unit 41 performs reversed event propagation by one logic starting from the logic E so as to set a priority level of 5 to a column at the connection destination of E and the connection source of A in the connection matrix 81 and a column at the connection destination of E and the connection source of D in the connection matrix 81. In the connection matrix 81, priority levels are noted in brackets, and the same is true of the following description.

Furthermore, the allocation unit 41 performs reversed event propagation by one logic starting from the logic C so as to set a priority level of 3 to a column at the connection destination of C and the connection source of B in the connection matrix 81.

In a third state, priority levels set by the allocation unit 41 through the further reversed event propagation by one logic are illustrated in the connection matrix 81. In a case where the logic E serves as the starting point, a priority level of 5 is set to a column at the connection destination of D and the connection source of B in the connection matrix 81. In addition, a priority level of 5 is set to a column at the connection destination of D and the connection source of A in the connection matrix 81.

In a fourth state, the allocation unit 41 determines a highest value in a row corresponding to the logic B in the connection matrix 81 obtained in the third state as a priority level of the logic B. In this example, it is determined that the logic B has the priority level of 5. Accordingly, the priority levels of all the logics A to E are 5, 5, 3, 5, and 5.

Figure 13:
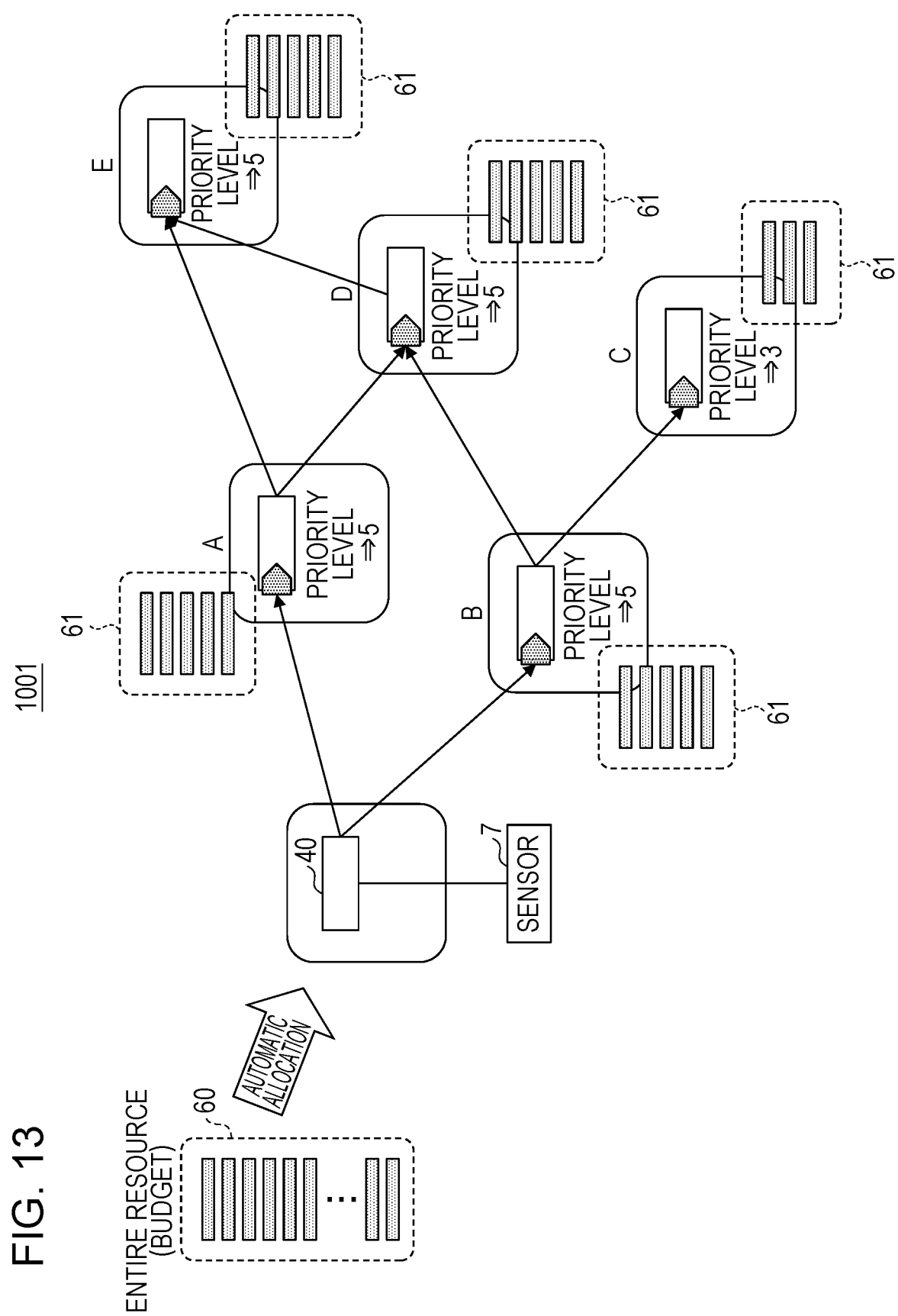
FIG. 13 is a diagram illustrating a resource allocation process.

Next, the resource allocation process will be described taking the priority levels illustrated in the fourth state of FIG. 12 as an example. FIG. 13 is a diagram illustrating the resource allocation process. In FIG. 13, an example of resource allocation based on the priority levels illustrated in FIG. 11 is illustrated.

The allocation unit 41 calculates allocation ratios by obtaining ratios of the priority levels of the logics A to E to a sum of the priority levels of 23 while a sum of the priority levels corresponds to an entire resource 60. Since the priority levels of the logics A, B, D, and E is 5, the allocation unit 41 determines that allocation ratios to the entire resource is 0.22. Furthermore, since the priority level of the logic C is 3, the allocation unit 41 determines that an allocation ratio to the entire resource is 0.12. An arbitrary method is employed for rounding of a digit number and a fraction, and the method is not limited to this example.

The entire resource 60 corresponds to the budget of the user, and allocated resources 61 correspond to resources of the logics A to E allocated from the entire resource 60 in accordance with the allocation ratios based on the priority levels.

Figure 14A:
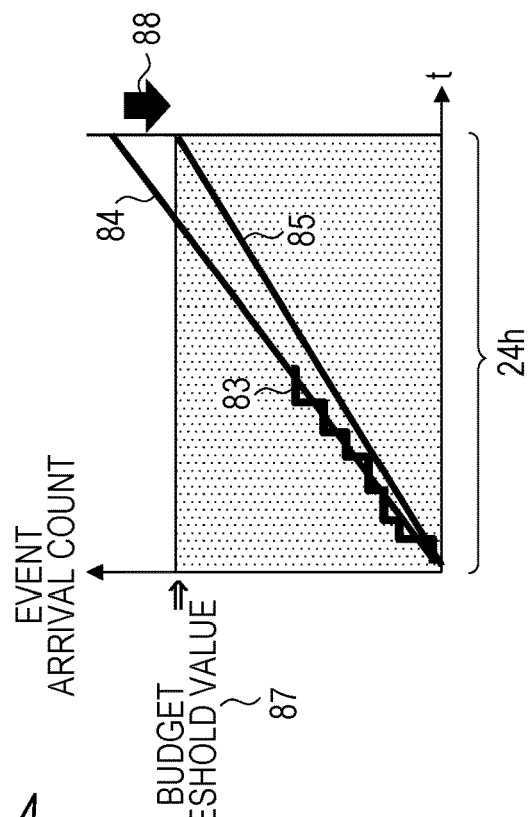
FIGS. 14A and 14B are diagrams illustrating a method for adjusting an execution inhibition count.
Figure 14B:
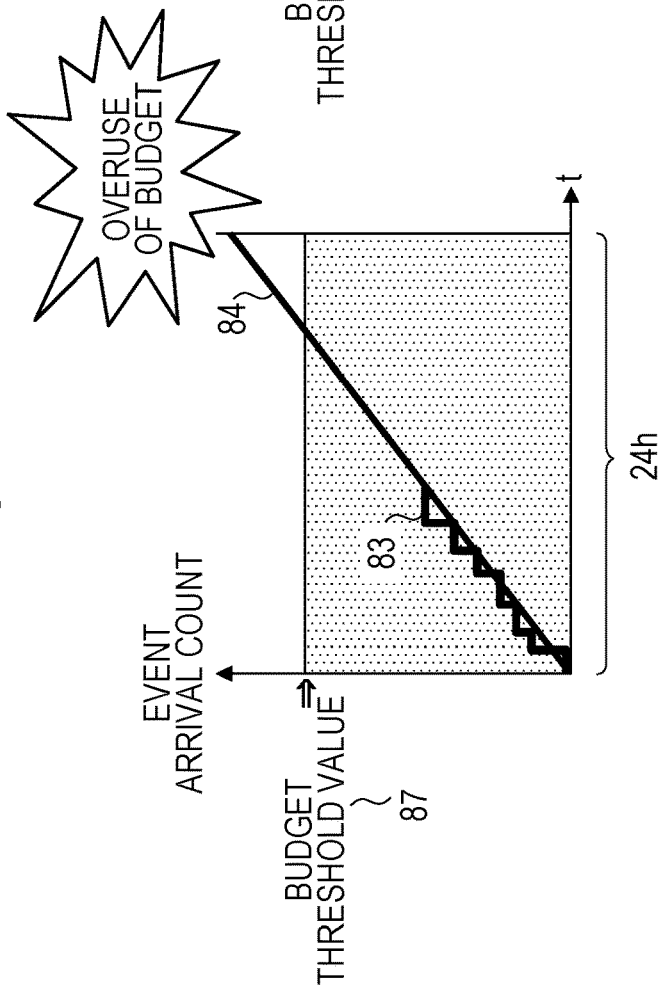

Next, a method for adjusting the execution inhibition count employed in the monitoring/estimating unit 43 in the adaptive adjustment process performed in step S73 of FIG. 4 will be described. FIGS. 14A and 14B are graphs illustrating the method for adjusting the execution inhibition count. In the graphs illustrated in FIGS. 14A and 14B, axes of abscissae denote a time and axes of ordinates denote an event arrival count. It is assumed in this embodiment that the operation period is 24 hours and a certain logic 3 is taken as an example. However, the operation period is not limited to 24 hours.

In FIG. 14A, a record 83 indicates an accumulation value of the event arrival count of events generated at a predetermined time interval based on the arrival count included in the event arrival record DB 55. The monitoring/estimating unit 43 generates an arrival estimation model 84 using transition of the accumulation value so as to estimate an accumulation value in 24 hours after start of operation. The arrival estimation model 84 may be obtained by (linear or nonlinear) regression analysis, a neural network (machine learning), or the like. An event arrival count for one minute may be obtained in accordance with the accumulation value and a total time. The event arrival count per one minute correspond to an event generation frequency.

Furthermore, the monitoring/estimating unit 43 converts the budget of the user into a total event arrival count in the operation period, multiplies the total event arrival count by the allocation ratio of the resource allocation information 59, and sets a budget threshold value 87 for each logic 3. If the accumulation value after 24 hours is larger than the budget threshold value 87, the monitoring/estimating unit 43 estimates overuse of the budget.

In FIG. 14B, a difference count 88 obtained by subtracting the budget threshold value 87 from the accumulation value obtained after 24 hours indicates an overuse portion of the budget. The monitoring/estimating unit 43 calculates the execution inhibition count such that an integrated value of the arrival estimation model 84 is within the budget so that a logic execution count becomes equal to or smaller than the budget threshold value 87 relative to the accumulation value of the event arrival count.

Next, a method for obtaining surplus resources employed in the monitoring/estimating unit 43 in the adaptive adjustment process performed in step S73 of FIG. 4 will be described. FIGS. 15A and 15B are diagrams illustrating the method for obtaining surplus resources. Graphs of FIGS. 15A and 15B are similar to those of FIGS. 14A and 14B.

In FIG. 15A, as with the case of FIG. 14A, a record 83 indicates an accumulation value of the event arrival count generated at a predetermined time interval. The monitoring/estimating unit 43 generates the arrival estimation model 84 by the method described with reference to FIG. 14A, estimates an accumulation value after 24 hours, and sets the budget threshold value 87 using the allocation ratios of the resource allocation information 59. If the accumulation value after 24 hours is smaller than the budget threshold value 87, the monitoring/estimating unit 43 estimates that surplus resources exist.

In FIG. 15B, surplus resources 89 obtained by subtracting the accumulation value obtained after 24 hours from the budget threshold value 87 are illustrated. The surplus resources 89 indicates an estimated amount of surplus resources. The monitoring/estimating unit 43 transmits a surplus resource allocation request to the allocation unit 41 so as to request reallocation of the resources from the logics 3 which have the surplus resources 89 to the logics 3 which do not have the surplus resources 89.

The surplus resource allocation request includes logic IDs of the logics 3 in which the surplus resources 89 are detected and the surplus resources 89. Furthermore, the surplus resource allocation request may include information indicating logic IDs in descending order of shortage of the resources.

Figure 16B:
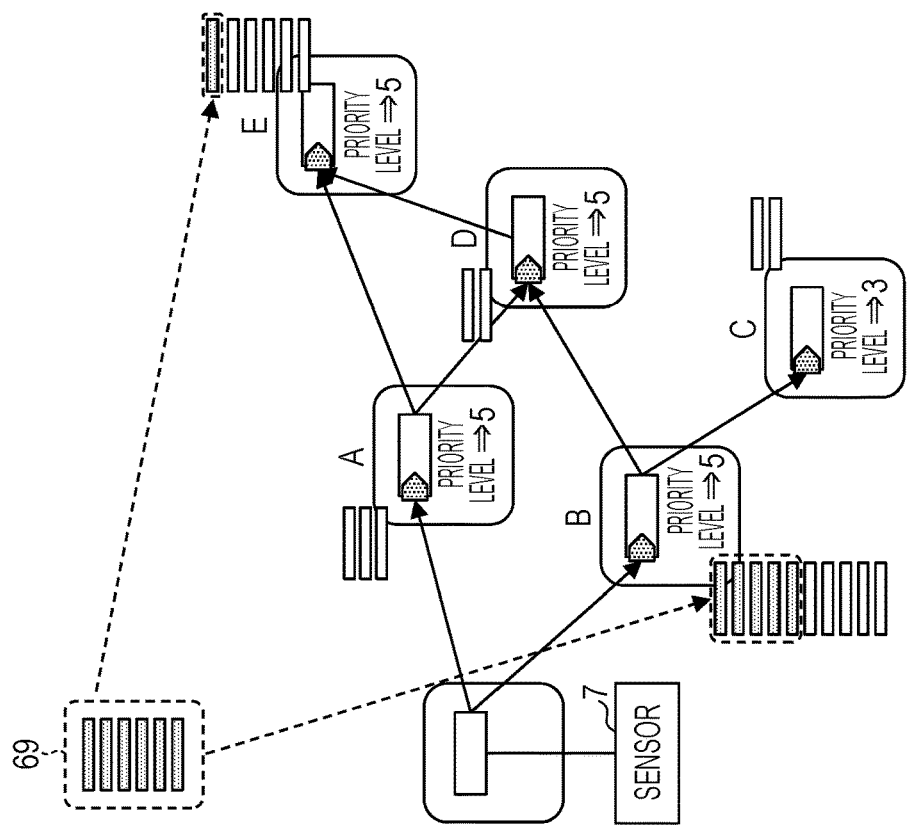
FIGS. 16A and 16B are diagrams illustrating a surplus resource allocation process.
Figure 16A:
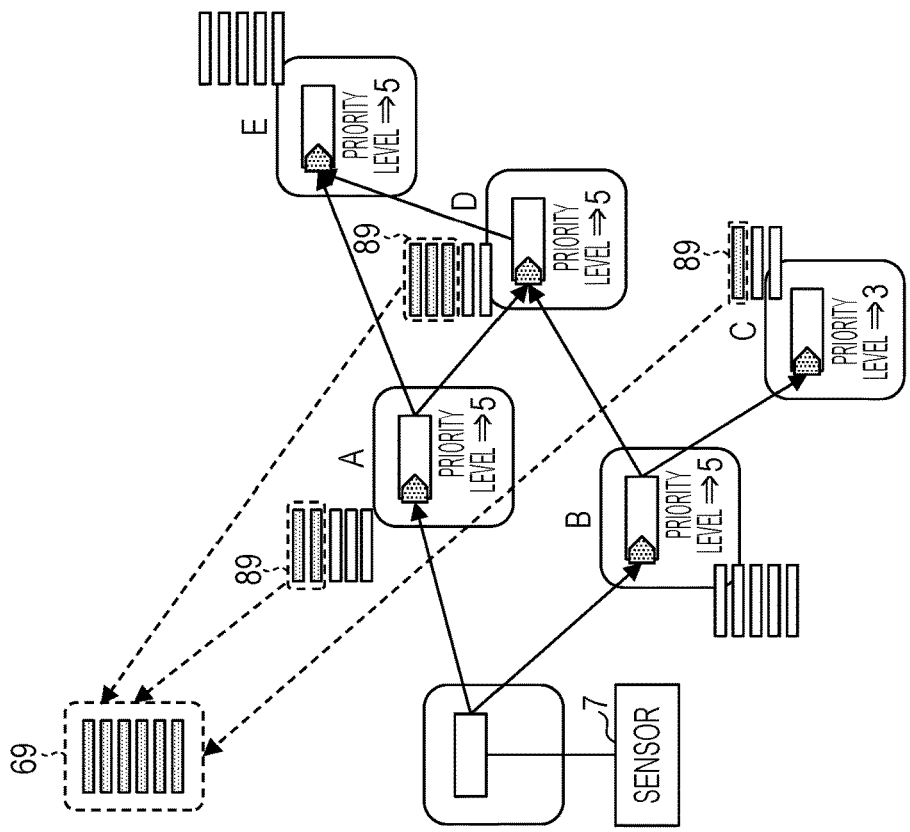

Next, an example of the surplus resource allocation process performed in step S74 of FIG. 4 will be described. FIGS. 16A and 16B are diagrams illustrating an example of the surplus resource allocation process. It is assumed that logic IDs of the logics A to E are 001 to 005, respectively, and the priority level information 51 of FIG. 9 is employed as priority levels.

In FIG. 16A, an example of collection of the surplus resources 89 is illustrated. The allocation unit 41 obtains a sum of the surplus resources 89 in response to the surplus resource allocation request. In this example, an entire surplus resource 69 is obtained by adding the surplus resources 89 of the logics A, C, and D.

In FIG. 16B, an example of allocation of the entire surplus resource 69 is illustrated. The allocation unit 41 allocates the entire surplus resource 69 to the logics B and E which do not have surplus resources 89. An allocation amount is determined based on a priority level. Even though priority levels are the same, a difference between event arrival counts may be large. In a case where logic IDs are assigned in descending order of shortage of resources according to the surplus resource allocation request, the allocation unit 41 may determine an allocation amount based on a priority level and the shortage of resources in this state.

Figure 17A:
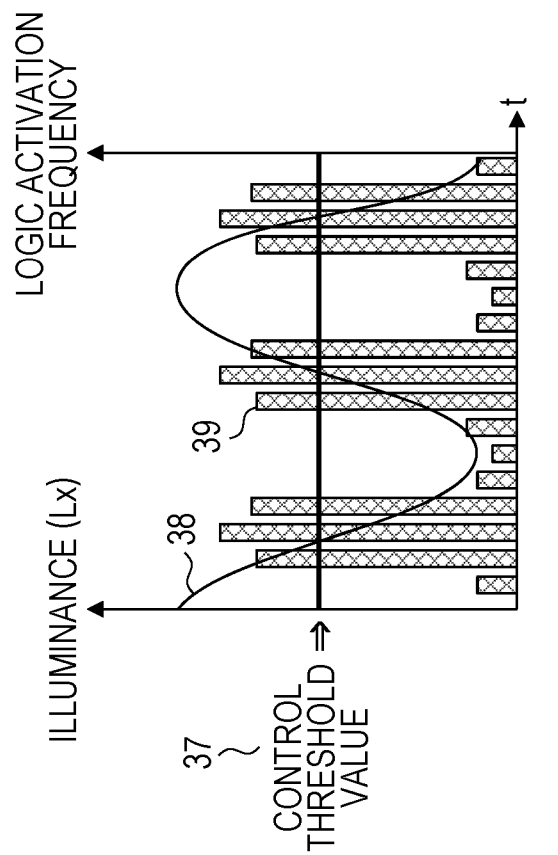
FIGS. 17A and 17B are diagrams illustrating an example of control of an event generation frequency.
Figure 17B:
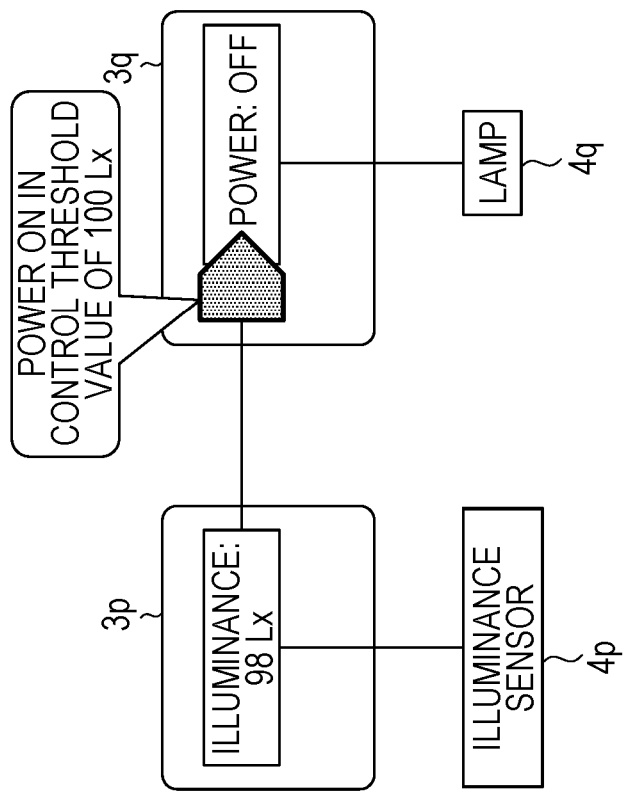

The surplus resources may be obtained by controlling an event generation frequency in addition to the adaptive adjustment process described above. FIGS. 17A and 17B are diagrams illustrating an example of control of the event generation frequency. In FIG. 17A, a logic $3p$ is connected to a logic $3q$, and the logic $3p$ serving as a connection source generates an event by receiving an illuminance value supplied from an illuminance sensor $4p$ so as to activate the logic $3q$ serving as a connection destination which turns on/off a lamp $4q$, for example.

In FIG. 17A, a case where a control threshold value 37 which is a trigger of output of the logic $3p$ is registered in advance is illustrated as an example. The control threshold value 37 is 100 Lx, for example. When an illuminance value obtained by the illuminance sensor $4p$ is included in a detection range determined in advance for the control threshold value of 100 Lx, the logic $3p$ notifies the logic $3q$ of an event indicating the illuminance value so as to reduce the number of times an input event arrives in the logic $3q$.

The execution inhibition count is determined such that logic $3q$ is in an ON state at all times while the control threshold value is 100 Lx, and as the illuminance value represented by an input event is closer to the control threshold value 37 within the determined detection range, an activation frequency becomes higher. The execution inhibition count is determined such that, as the illuminance value is farther from the control threshold value 37, the activation frequency becomes lower. For example, the activation frequency of the logic $3q$ is increased or decreased in inverse proportion to a difference between the illuminance value of the input event and the control threshold value 37 in the detection range.

In the graph of FIG. 17B, an axis of abscissae denotes a time, a left axis of ordinate denotes illuminance (Lx), and a right axis of ordinates denotes a logic activation frequency per a unit time. A line 38 indicates a change of the illuminance, and a bar graph 39 indicates the logic activation frequency. According to the graph in FIG. 17B, as the illuminance value is farther from the control threshold value 37, the logic activation frequency is lowered, and as the luminance value is closer to the control threshold value 37, the logic activation frequency becomes high. With this control, the surplus resources may be adaptively collected.

Figure 18:
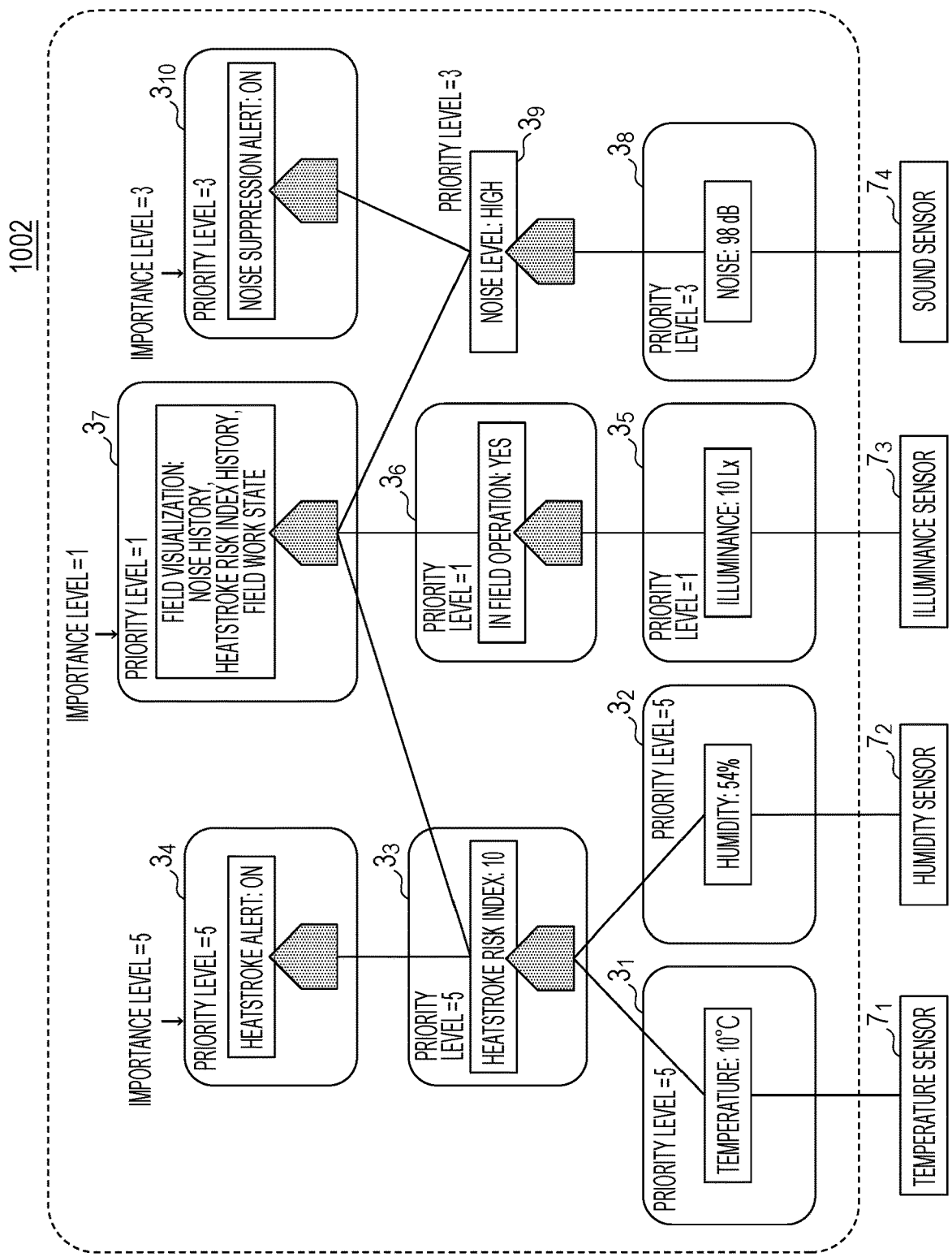
FIG. 18 is a diagram illustrating a concrete example of a micro service according to this embodiment.

FIG. 18 is a diagram illustrating an example of a micro service 1002 according to this embodiment in detail. The micro service 1002 illustrated in FIG. 18 includes a temperature sensor $7_1$, a humidity sensor $7_2$, an illuminance sensor $7_3$, a sound sensor $7_4$, and logics $3_1$ to $3_{10}$. Activation frequencies of the logics $3_1$ to $3_{10}$ are controlled by the overall optimizing processor 40.

The logic $3_1$ generates an event when a value of a temperature transmitted from the temperature sensor $7_1$ is equal to or larger than a set control threshold value of 10° C. The logic $3_2$ generates an event when a value of humidity transmitted from the humidity sensor $7_2$ is equal to or larger than a set control threshold value of 54%. The events generated by the logics $3_1$ and $3_2$ are supplied to the logic $3_3$.

The logic $3_3$ calculates a heatstroke risk index based on values of the input events supplied from the logic $3_1$ and the logic $3_2$ and generates an event when the obtained heatstroke risk index is larger than a set control threshold value of 10. The event generated in the logic $3_3$ is supplied to the logics $3_4$ and $3_7$. The logic $3_4$ turns on a heatstroke alarm when the event is supplied from the logic $3_3$.

The logic $3_5$ generates an event when a value of illuminance supplied from the illuminance sensor $7_3$ is equal to or larger than a set control threshold value of 10 Lx. The event generated by the logic $3_5$ is supplied to the logic $3_6$. The logic $3_6$ determines that a field work is being performed in accordance with the input event supplied from the logic $3_5$ and generates an event. A control threshold value for the generation of an event is represented as follows: "field work: YES". The event generated in the logic $3_6$ is supplied to the logic $3_7$. The logic 37 performs a process of visualizing a field site using the values of the events supplied from the logic $3_3$, the logic $3_6$, and the logic $3_9$. As an example, information on noise history, heatstroke risk index history, a field work state, and the like is displayed.

The logic $3_8$ generates an event when a value of noise supplied from the sound sensor $7_4$ is equal to or larger than a set control threshold value of 98 dB. The event generated by the logic $3_8$ is supplied to the logic $3_9$. The logic $3_9$ determines that a noise level becomes high in accordance with the input event supplied from the logic $3_8$ and generates an event. The event generated in the logic $3_9$ is supplied to the logics $3_7$ and $3_{10}$. The logic $3_{10}$ turns ON a noise suppression alarm when the event is supplied from the logic $3_9$.

In this embodiment, a setting of an importance level may be performed by the user. The user may think that an error detection is to be performed in real time but visualization is not so important. In this case, an SLA obtained by the user for each main logic may be assigned as an importance level within the budget of the user.

In the example of FIG. 18, the user specifies an importance level of 5 to the logic $3_4$ of the heatstroke alert, an importance level of 1 to the logic $3_7$ of the field visualization, and an importance level of 3 to the logic $3_{10}$ of the noise suppression alert. In this case, the priority level of 5 is assigned to the logics $3_4$, $3_3$, $3_2$, and $3_1$ by the priority level determination process performed by the allocation unit 41 described above. The priority level of 1 is assigned to the logics $3_7$, $3_6$, and $3_5$. The priority level of 3 is assigned to the logics $3_{10}$, $3_9$, and $3_8$.

In this way, the priority levels of all the logics are automatically determined based on the logic selected by the user and the importance level. The user may specify SLA for each logic only by determining an importance level for a main logic.

The user may set an arbitrary amount as the budget of the user or the provider of the platform may set a charge for each content of a service and propose the charge to the user in advance. Content of services is categorized based on a category of the SLA and a degree of SLA, and a charge corresponding to a category may be set in advance.

FIG. 19 is a diagram illustrating an example of courses categorized according to a degree of SLA. In an example of a table of charges for categories illustrated in FIG. 19, the categories are arranged in a vertical direction and items of SLA are arranged in a horizontal direction. The categories includes a course X, a course Y, and a course Z. As the SLA items, "field monitoring/visualization application" (hereinafter referred to as an "SLA first item"), an "error notification application" (hereinafter referred to as an "SLA second item"), and a "charge (per month)" are illustrated.

In the course X, content to be provided in the SLA first item is "screen update every several seconds", content to be provided in the SLA second item is "arrival of notification after several minutes", and a charge is "XX, XXX". In the course Y, content to be provided in the SLA first item is "screen update every second", content to be provided in the SLA second item is "arrival of notification within approx. 1 minute", and a charge is "YY, YYY". In the course Z, content to be provided in the SLA first item is "screen update in real time", content to be provided in the SLA second item is "arrival of notification within several seconds", and a fee is "ZZ, ZZZ".

Since the course examples are proposed, the user may recognize a degree of service received within a desired budget. The proposal of the course examples is not limited to the examples. The number of categories, the number of SLA items, and content are determined by the platform provider.

Figure 20B:
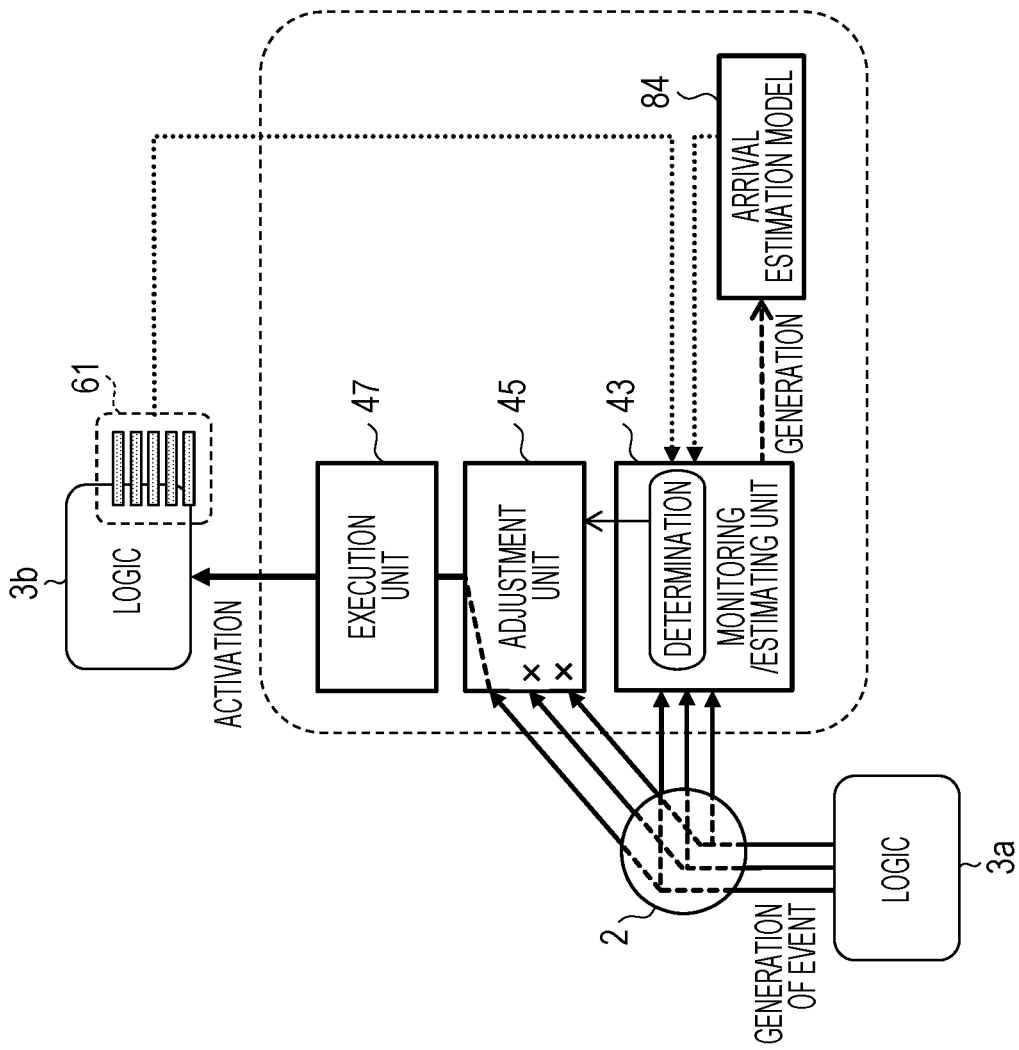
FIGS. 20A and 20B are diagrams illustrating generation of an event and a logic frequency.
Figure 20A:
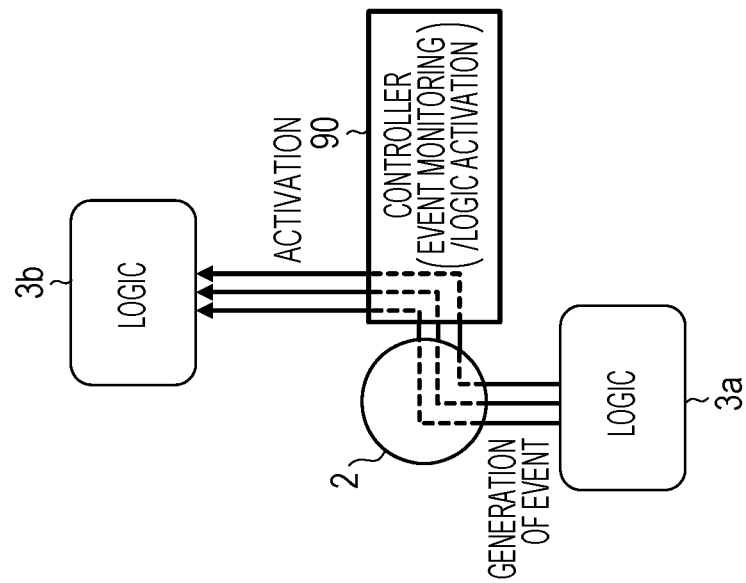

Next, the generation of an event and a logic frequency will be described with reference to FIGS. 20A and 20B. FIGS. 20A and 20B are diagrams illustrating the generation of an event and a logic frequency. In FIG. 20A, an example of logic activation relative to a general event between logics is illustrated. When an event is generated in a logic 3a of a preceding stage, a message blocker 2 receives the event, a controller 90 activates a logic 3b of a connection destination of the logic 3a, and the event is transmitted to the logic 3b. The controller 90 only performs control of monitoring of the event supplied to the logic 3b of the connection destination and the activation of the logic 3b performed every time an event is generated.

In FIG. 20B, a case of this embodiment is illustrated. In this embodiment, the monitoring/estimating unit 43 monitors generation of all events and generates the arrival estimation model 84 based on transition of the number of times an event is generated. Furthermore, the monitoring/estimating unit 43 monitors the allocated resources 61 of the logic 3b, performs a determination of overuse of resources or surplus of resources with reference to the generated arrival estimation model 84. When the overuse of resources is detected, the monitoring/estimating unit 43 transmits a result of a determination indicating an execution inhibition count relative to the logic 3b.

The adjustment unit 45 controls the execution unit 47 based on the result of the determination of the overuse of resources supplied from the monitoring/estimating unit 43. When a value of a counter which counts the number of times an event has arrived in the logic 3b reaches the execution inhibition count, the adjustment unit 45 instructs the execution unit 47 to execute the logic 3b, resets the counter, and increments the counter every time an event has arrived.

While the value of the counter is smaller than the execution inhibition count, the event is ignored (discarded) and the execution unit 47 does not activate the logic 3b. In this way, the resources corresponding to the number of times an event which does not activate the logic 3b has arrived may be saved and consumption of the budget of the user may be suppressed.

As described above, in this embodiment, the user may continuously use a micro service within an operation period in which the budget is applied only by determining the budget, selecting at least one logic, and specifying an importance level. The platform provider may reduce a development burden by flexible scalability which avoids a change of service design, such as a change of content of logic 3, in accordance with an amount of a budget.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to store records relating to logics included within a cloud computer platform, the logics being arranged in a chain graph, the records including information on past activation of each of the logics in a predetermined operation period, wherein the logics perform event propagation in which each logic is activated by an input event to generate an output event which is to be input to another logic; and
a processor coupled to the memory and the processor configured to:
assign priority levels to the respective logics based on an importance level of at least one of the logics and a structure of the chain graph;
allocate tokens to the logics based on the priority levels, the tokens relating to a budget for using service resources of the logics in the predetermined operation period;
estimate for each of the logics, based on the records stored in the memory, a total number of generated output events to obtain an expected amount of tokens corresponding to the total number, the total number being an accumulated number of times each of the logics generates an output event in the predetermined operation period;
compare, for each of the logics, the expected amount of tokens to an amount of the allocated tokens to determine whether each of the logics has a surplus or a shortage in the allocated tokens;
adjust a frequency of activating each of logics having the shortage in the allocated tokens;
calculate a total amount of the surplus in the allocated tokens; and
reallocate the total amount of the surplus to the logics having the shortage in the allocated tokens.

2. The information processing apparatus according to claim 1, wherein the processor is further configured to
detect a second logic positioned in a reverse direction of the event propagation in the chain graph from a first logic having a first priority level; and
assign the first priority level to the second logic.

3. The information processing apparatus according to claim 2, wherein the processor is further configured to maintain a second priority level already assigned to the second logic without assigning the first priority level when the second priority level is higher than the first priority level.

4. The information processing apparatus according to claim 1, wherein the tokens allocated to the logics indicate the service resources available in the predetermined operation period within the budget.

5. The information processing apparatus according to claim 1, wherein the tokens allocated to the logics indicate the budget.

6. The information processing apparatus according to claim 1, wherein the processor is further configured to
calculate, for each of the logics, a difference between a value of an input event and a predetermined threshold value; and
control, for each of the logics, the frequency depending on the difference such that a second frequency is set for a second difference smaller than a first difference, the second frequency being higher than a first frequency set for the first difference.

7. A computer-implemented method for allocating service resources of logics arranged in a chain graph within a cloud computing platform, the method comprising:
assigning by a computer priority levels to the respective logics based on an importance level of at least one of the logics and a structure of the chain graph, wherein the logics perform event propagation in which each logic is activated by an input event to generate an output event which is to be input to another logic;
allocating tokens to the logics based on the priority levels, the tokens relating to a budget for using the service resources in a predetermined operation period;
estimating for each of the logics, based on records stored in a memory, a total number of generated output events to obtain an expected amount of tokens corresponding to the total number, the total number being an accumulated number of times each of the logics generates an output event in the predetermined operation period, the records including information on past activation of each of the logics in the predetermined operation period;
comparing, for each of the logics, the expected amount of tokens to an amount of the allocated tokens to determine whether each of the logics has a surplus or a shortage in the allocated tokens;
adjusting a frequency of activating each of logics having the shortage in the allocated tokens;
calculating a total amount of the surplus in the allocated tokens; and
reallocating the total amount of the surplus to the logics having the shortage in the allocated tokens.

8. A non-transitory computer-readable recording medium having stored therein a program that causes a computer to execute a process, the process comprising:
assigning priority levels to respective logics arranged in a chain graph within a cloud computing platform based on an importance level of at least one of the logics and a structure of the chain graph, wherein the logics perform event propagation in which each logic is activated by an input event to generate an output event which is to be input to another logic;
allocating tokens to the logics based on the priority levels, the tokens relating to a budget for using service resources of the logics in a predetermined operation period;
estimating for each of the logics, based on records stored in a memory, a total number of generated output events to obtain an expected amount of tokens corresponding to the total number, the total number being an accumulated number of times each of the logics generates an output event in the predetermined operation period, the records including information on past activation of each of the logics in the predetermined operation period;
comparing, for each of the logics, the expected amount of tokens to an amount of the allocated tokens to determine whether each of the logics has a surplus or a shortage in the allocated tokens;
adjusting a frequency of activating each of logics having the shortage in the allocated tokens;
calculating a total amount of the surplus in the allocated tokens; and
reallocating the total amount of the surplus to the logics having the shortage in the allocated tokens.

* * * * *